(12) United States Patent
Villadiego et al.

(10) Patent No.: US 7,631,348 B2
(45) Date of Patent: Dec. 8, 2009

(54) SECURE AUTHENTICATION USING A LOW PIN COUNT BASED SMART CARD READER

(75) Inventors: Henry Villadiego, Long Beach, NY (US); Glen Rockford, Wading River, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 687 days.

(21) Appl. No.: 10/995,000

(22) Filed: Nov. 22, 2004

(65) Prior Publication Data
US 2006/0112423 A1 May 25, 2006

(51) Int. Cl.
G06F 7/04 (2006.01)
G06F 13/00 (2006.01)

(52) U.S. Cl. .................. 726/9; 713/185; 710/100; 710/107; 710/305; 710/313

(58) Field of Classification Search ............ 726/9
See application file for complete search history.

(56) References Cited

U.S. PATENT DOCUMENTS

| | | | | |
|---|---|---|---|---|
| 6,366,777 B1 * | 4/2002 | Uusitalo | ............. | 455/433 |
| 6,823,451 B1 * | 11/2004 | Gulick et al. | ............. | 713/153 |
| 6,832,317 B1 * | 12/2004 | Strongin et al. | ............. | 713/182 |
| 6,862,641 B1 * | 3/2005 | Strongin et al. | ............. | 710/260 |
| 7,007,300 B1 * | 2/2006 | Weber et al. | ............. | 726/21 |
| 7,047,343 B2 * | 5/2006 | Shaw | ............. | 710/305 |
| 7,076,669 B2 * | 7/2006 | Poisner et al. | ............. | 726/22 |
| 7,216,362 B1 * | 5/2007 | Strongin et al. | ............. | 726/16 |
| 7,343,498 B2 * | 3/2008 | Morrow | ............. | 713/300 |
| 2003/0084342 A1 | 5/2003 | Girard | | |
| 2003/0088326 A1 | 5/2003 | Du et al. | | |
| 2003/0093607 A1 | 5/2003 | Main et al. | | |
| 2003/0186722 A1 * | 10/2003 | Weiner | ............. | 455/558 |
| 2003/0196088 A1 * | 10/2003 | Poisner et al. | ............. | 713/172 |
| 2004/0015694 A1 | 1/2004 | DeTreville | | |
| 2004/0034774 A1 | 2/2004 | Le Saint | | |

(Continued)

OTHER PUBLICATIONS

"TPM Main: Part 1 Design Principles," Specification Version 1.2, Revision 62, Trusted Computer Group, Inc., Oct. 2, 2003, 161 pages.

(Continued)

Primary Examiner—Christian LaForgia
(74) Attorney, Agent, or Firm—Meyertons Hood Kivlin Kowert & Goetzel, P.C.; Jeffrey C. Hood

(57) ABSTRACT

A computer system may receive one or more credentials of a user (e.g., username, password, etc.) from an integrated circuit (IC) device carried by the user. The computer system may include an IC device interface to receive the user credential(s) from the IC device. The IC device interface may be coupled to a CPU of the computer system through a low pin count (LPC) bus. The user credential(s) may be used to grant access to software and/or to grant access to information. Access may be granted to information stored on the computer system. In some embodiments, the computer system may be coupled to a network and transmit the user credential(s) from the IC device and a request for access of information to a service provider coupled to the network. The service provider may grant or deny the request for access of information based on user credential(s).

45 Claims, 20 Drawing Sheets

U.S. PATENT DOCUMENTS

| | | | |
|---|---|---|---|
| 2004/0166839 A1* | 8/2004 | Okkonen et al. | 455/419 |
| 2005/0044408 A1* | 2/2005 | Bajikar et al. | 713/201 |
| 2005/0114571 A1* | 5/2005 | Shaw | 710/62 |
| 2005/0154930 A1* | 7/2005 | Morrow | 713/300 |
| 2006/0099991 A1* | 5/2006 | Bajikar et al. | 455/558 |

OTHER PUBLICATIONS

"TPM Main: Part 2 TPM Structures," Specification Version 1.2, Revision 63, Trusted Computer Group, Inc., Oct. 2, 2003, 176 pages.

"TCG Software Stack (TSS) Specification," Version 1.10 Golden, Trusted Computer Group, Inc., Aug. 20, 2003, 22 pages.

"Intel® Low Pin Count (LPC): Interface Specification," Revision 1.1, Intel Corporation, Aug. 2002, Document No. 251289-001, 54 pages.

Bajikar, Sundeep, "Trusted Mobile Keyboard Controller Architecture," Intel Corporation, Sep. 17, 2003, 25 pages.

Smart Card Alliance, "Privacy and Secure Identification Systems: The Role of Smart Cards as a Privacy-Enabling Technology," A Smart Card Alliance White Paper, Feb. 2003, 33 pages.

* cited by examiner

| | | −300E |
|---|---|---|
| Credential Information 1 | Information ID 1 | Access Level 1 |
| Credential Information 1 | Application ID 1 | Access Level 2 |
| Credential Information 2 | Information ID 1 | Access Level 3 |
| Credential Information 3 | Information ID 1 | Access Level 1 |
| Credential Information 1 | Application ID 2 | Access Level 5 |
| Credential Information 3 | Information ID 3 | Access Level 4 |

SECURE AUTHENTICATION USING A LOW PIN COUNT BASED SMART CARD READER

BACKGROUND

1. Field of the Invention

This invention relates generally to computer authentication systems and methods. More specifically, the invention relates to a user using an integrated circuit device to provide various user credentials, among other information, to one or more computer systems.

2. Description of the Related Art

Typically, individuals are required to provide one or more credentials such as identification and authentication information (e.g., a username and password) to access various computer systems, networks, and/or information. Various methods and systems can be used for identification and authentication that can be more robust than a username and password combination. One such system is a smart card system. A smart card is, typically, a card about the size of a credit card or a business card which comprises an embedded integrated circuit (IC) device. Other form factors of smart cards can be used, as well. The IC device generally comprises a microprocessor or microcontroller, a memory, and an input/output (I/O) interface, among other elements. The IC device is programmed with various information and/or one or more software programs.

In general, smart cards can provide one or more credentials such as identification and authentication information along with other information such as bank account information, medical information, personal identification numbers (PINs), a digital certificate, a digital signature, social security information, etc. Smart cards can even verify information of a human being before disseminating or transmitting stored information. For example, a smart card can verify fingerprint information before disseminating and/or transmitting a password.

Smart cards can be coupled to a computer system in a variety of ways. In various examples, a smart card may be coupled to a computer system by a universal serial bus (USB), serial (e.g., RS-232), PCMCIA (Personal Computer Memory Card International Association), a keyboard (e.g., with a PS/2 cable and/or connector), or FireWire (IEEE 1394), among other typical couplings for peripheral devices.

In addition to identifying and/or authenticating a user of a computer system by using a smart card to provide one or more user credentials, other authentication systems and/or methods may also be utilized. For example, various credentials of the computer system used by the user may also be used in determining whether or not access may be granted to the user and/or the computer system used by the user. In one instance, software executing on the computer system can require credentials of the computer system before executing further functionality of the software and/or before executing other software. In a second instance, a server computer system may have a list of computer system credentials indicating certain computer systems with which it may communicate, and each computer system may provide credentials to the server computer system in order to communicate with the server computer system over a network. In other words, the server computer system may not communicate with a "rogue" computer system introduced to the network. Credentials that may be provided to the server computer system may include endorsement credentials, platform credentials, and/or conformance credentials, among other credentials. Each computer system may include an integrated circuit (IC) device which may be or may include a trusted platform module (TPM) which can manage the credentials and/or provide various credentials to the server computer system. In general, TPMs are not meant to be used on more than one computer system; thus, a TPM of a computer system is often soldered to the computer system.

Typically, if a computer system includes a TPM, the computer system uses a low pin count (LPC) bus to communicate with the TPM. The LPC bus was designed by Intel to implement an ISA (Industry Standard Interface) bus in a computer system. In general, the LPC bus may include a range of six to thirteen interface pins while the ISA bus may include a range of thirty-six to ninety-eight interface pins. The LPC bus has certain characteristics or operations which require executing specific software to communicate with devices (e.g., the TPM) coupled to the LPC bus. For example, the LPC bus has read and write cycles which are used for retrieving and storing data of devices coupled to the LPC bus, and software executing on the computer system would need to be executable to use these read and write cycles to communicate with devices coupled to the LPC bus.

In general, an operating system executing on a computer system may comprise the software executable to use these read and write cycles to communicate with devices coupled to the LPC bus, and, thus, the operating system can communicate with a TPM of the computer system. An operating system communicating with the TPM is considered a "trusted" operating system. Applications executing on the computer system can rely on credentials and/or other identification and authentication information from the TPM. Since these applications rely on credentials from the TPM, they are considered "trusted" applications. In general, the trusted operating system executes the trusted applications and providers one or more software interfaces that allow the trusted applications to communicate with the TPM.

Even with the one or more software interfaces that allow the trusted applications to interface with a device coupled to the LPC bus, currently, there exists no method and/or no system to access an IC device carried by a user (e.g., an IC device comprised in a smart card) through a LPC bus of a computer system. Therefore, there exists a need for a system and method for a trusted operating system and/or trusted application to interface with IC devices which are removable (i.e. carried by users) and provide user credentials and which are coupled to the LPC bus of a computer system.

SUMMARY OF THE INVENTION

In various embodiments, an integrated circuit (IC) device (e.g., included in a removable smart card carried by a user) may store user credential information. The user credential information may comprise identification information (e.g., a username) and/or authentication information (e.g., a password), among other information, associated with a user. In some embodiments, a second IC device may be substantially permanently coupled to the computer system and may provide credential information of a computer system to the computer system.

The computer system may include an IC device interface to receive the user credential information from the IC device, and the IC device interface may be coupled to a CPU of the computer system through a low pin count (LPC) bus. In other words, the user credential information associated with the user may be provided by the IC device through a LPC bus of the computer system. In some embodiments, software (e.g., an operating system and/or other application) executing on the computer system may operate the LPC bus and/or may receive information provided by the IC device through the LPC bus.

The user credential information provided by the IC device through the LPC bus may be used to determine whether to grant access to program instructions and/or to information (e.g., private and/or sensitive information). A memory may be coupled to the computer system, and the memory may comprise a data structure which comprises a list of user credential information, a corresponding list of program instruction identifications (e.g., software application names) or information identifications, and/or access level and/or privilege level information.

In one example, the user may attempt to execute an application such as a word processor, a spreadsheet, accounting software, etc. on the computer system. Software (e.g., an operating system or the application) executing on the computer system may use the user credential information provided by the IC device and the identification of the application (e.g., an application identification or application name) to determine whether or not access to the application may be granted. In some embodiments, determining whether or not access to the application may be granted may include indexing into a data structure which comprises a list of credentials and a corresponding list of application identifications (IDs). If the user credential information and/or the identification of the application are not found in the data structure, access may not be granted. If the user credential information and the identification of the program instructions are found in the data structure, access may be granted. The data structure may further comprise various access and/or privilege levels associated with each credential information and application identification pair. In some embodiments, access may be granted based on an access level and/or privilege level corresponding to the user credential information and the identification of the program instructions.

In a second example, the user may attempt to access information (e.g., private and/or sensitive information) on the computer system. Software (e.g., an operating system or other application) executing on the computer system may use the user credential information provided by the IC device and an identification of the information to determine whether or not access may be granted to the information. In some embodiments, determining whether or not access to the information may be granted may include indexing into a data structure which comprises a list of credentials and a corresponding list of information IDs. If the user credential information and the identification of the information are not found in the data structure, access may not be granted. If the user credential information and the identification of the information are found in the data structure, access may be granted. The data structure may further comprise various access and/or privilege levels associated with each credential information and information identification pair. In some embodiments, access may be granted based on an access level and/or privilege level corresponding to the user credential information and the identification of the information.

In some embodiments, the computer system may be coupled to a network. A request for access of information and credentials (e.g., user credentials, computer system credentials, etc.) may be transmitted by the computer system to a service provider coupled to the network. The service provider may use the credential information provided by the computer system and the request for access of information to determine whether to grant access to the information. In some embodiments, a second IC device may be coupled to the LPC bus, and the second IC device may store computer system credential information which is associated with the computer system.

In various embodiments, a memory (e.g., a database coupled to the network) may be coupled to the service provider, and the memory may comprise a data structure which comprises a list of user credential information, a corresponding list of information types or identifications, and a corresponding list of access level and/or privilege level information. Software executed by the service provider may use the user credential information and an identification of the information (e.g., private and/or sensitive information identification) to index into the data structure to determine whether or not access may be granted to the information. If the user credential information and the identification of the information are not found in the data structure, access may not be granted. If the user credential information and the identification of the information are found in the data structure, access to the requested information may be granted. In some embodiments, access may be granted based on the access level and/or privilege level information corresponding to the user credential information and the identification of the information.

BRIEF DESCRIPTION OF THE DRAWINGS

Other objects and advantages of the invention will become apparent upon reading the following detailed description and upon reference to the accompanying drawings in which:

FIGS. 5A-5E illustrate various examples of data structures which store user information, identification information of application or information, and/or access level information, according to various embodiments;

Figure 1A:
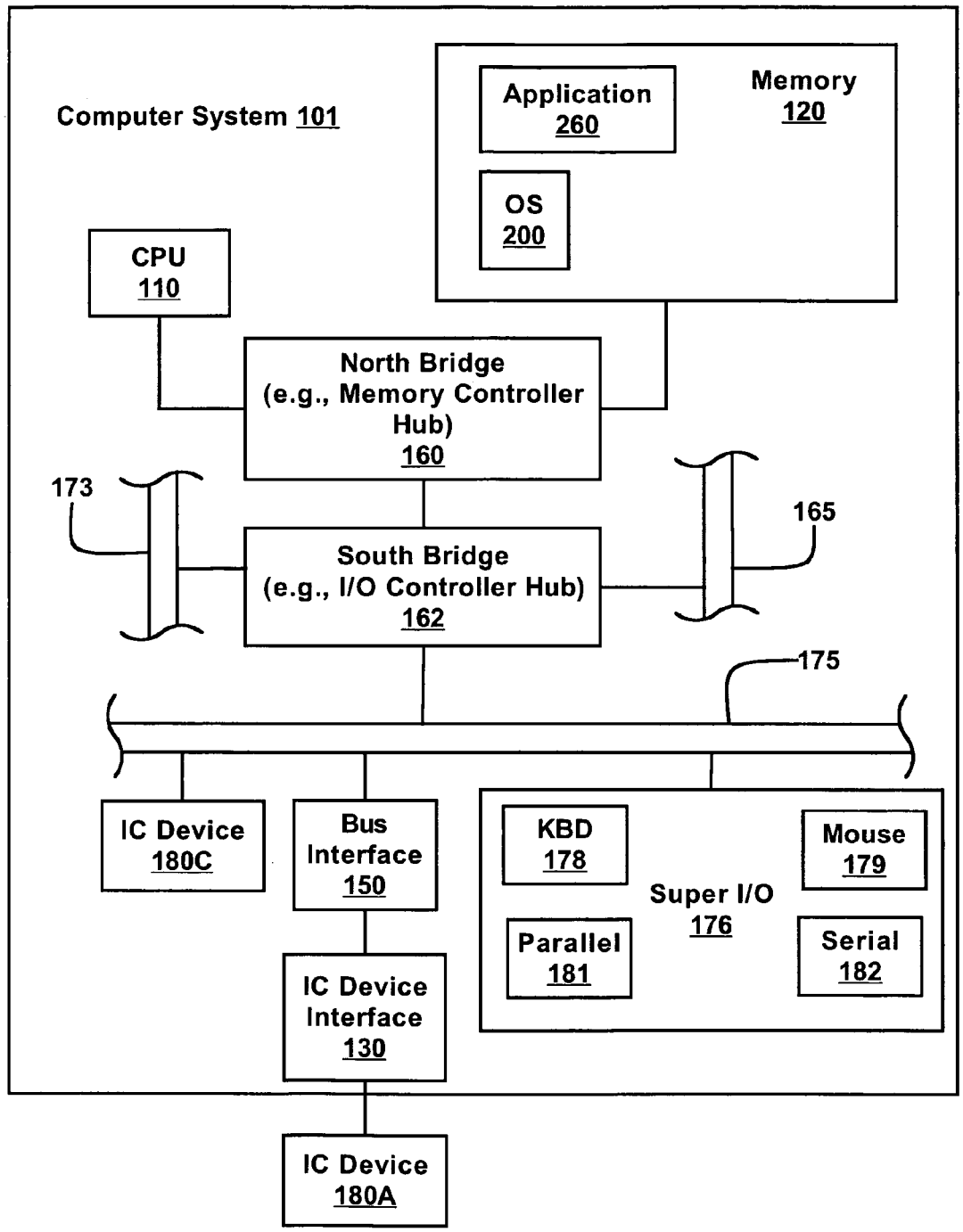
FIGS. 1A-1B are block diagrams of a computer system and integrated circuit devices, according to various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Incorporation by Reference

The following references are hereby incorporated by reference in their entirety as though fully and completely set forth herein:

"Intel Low Pin Count (LPC) Interface Specification" August 2002 Revision 1.1;

"TCG Software Stack (TSS) Specification" Version 1.10 Golden Aug. 20, 2003;

"TPM Main Part 1 Design Principles Specification" Version 1.2 Revision 62 Oct. 2, 2003; and "TPM Main Part 2 Design Principles Specification" Version 1.2 Revision 62 Oct. 2, 2003.

FIG. 1—Components Included in a Computer System

Figure 1B:
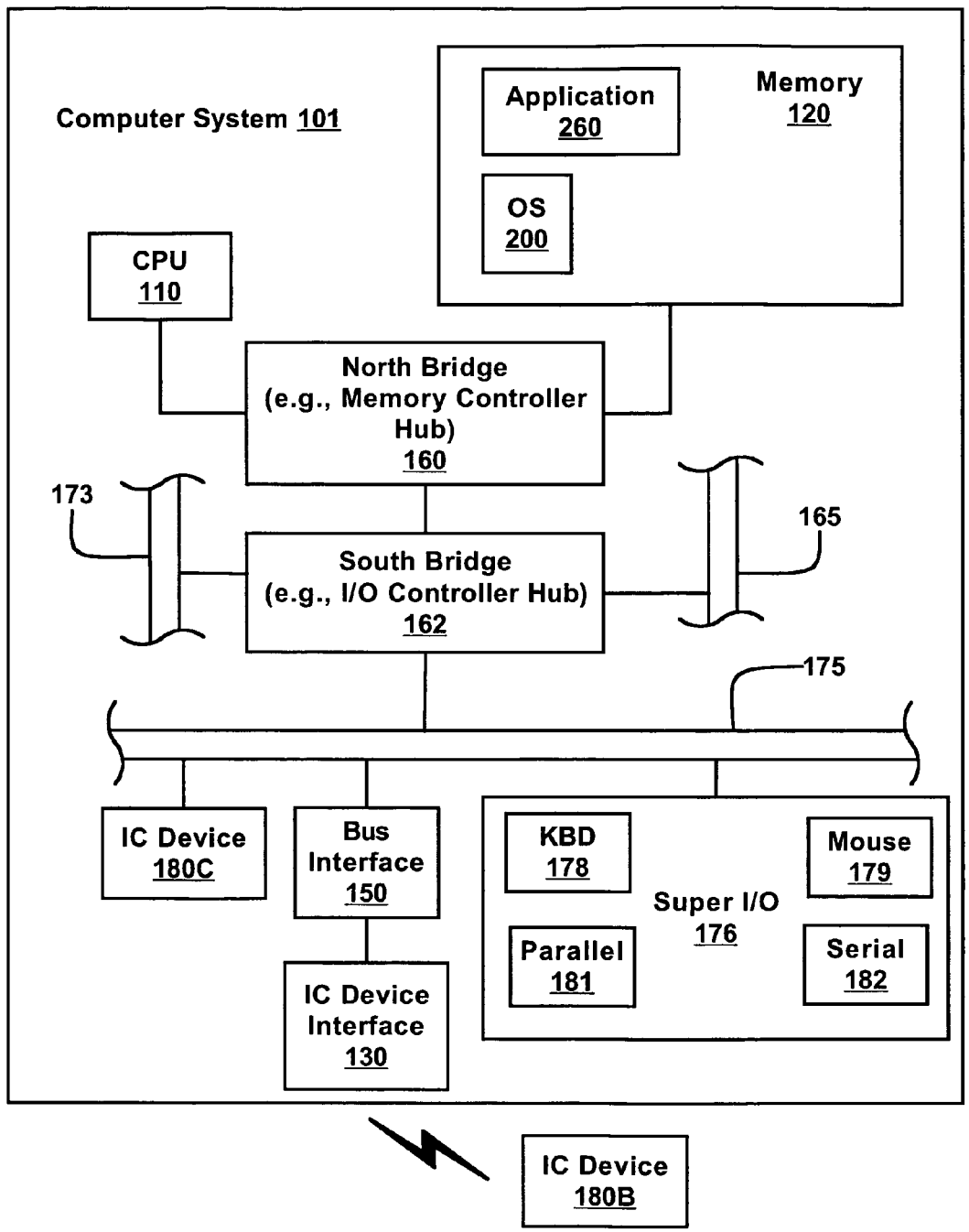

In various embodiments, a computer system 101 may include various components illustrated in FIGS. 1A-1B. Elements of computer system 101 not necessary to understand the present description have been omitted for simplicity. It is noted that computer system 101 may include various forms, including a personal computer system, mainframe computer system, workstation, network appliance, Internet appliance, personal digital assistant (PDA), cellular telephone, satellite telephone, communication device, embedded computer system, television system, or other device. In general, the term "computer system" can be broadly defined to encompass any device having a processor which executes instructions from a memory medium.

Computer system 101 may include at least one central processing unit or CPU 110 which may be coupled to a north bridge (e.g., memory controller hub) 160. A memory medium, typically including RAM (random access memory), such as memory 120, may be coupled to north bridge 160. Memory 120 may store an OS 200 and/or an application 260, as well as other software and/or information.

A south bridge (e.g., I/O controller hub) 162 may be coupled to north bridge 160, and expansion bus 165 may be coupled to south bridge 162. In various embodiments, expansion bus 165 may be a PCI (Peripheral Component Interconnect) expansion bus, although other bus types may be used. Expansion bus 165 may include slots for various devices and/or controllers, such as a video host controller, an integrated drive electronics (IDE) host controller, a universal serial bus (USB) host controller, a local area network (LAN) host adapter, a wireless local area network (WLAN) host adapter, and/or an audio adapter, among others.

In some embodiments, various buses may be coupled to south bridge 162 such as a USB (Universal Serial Bus) 173 and/or a low pin count (LPC) bus 175. As used herein, the terms "low pin count bus" and "LPC bus" refer to a bus that implements an ISA (Industry Standard Interface) bus in a computer system while comprising a lower number of interface pins than a standard ISA bus interface. For example, in some embodiments, a LPC bus may include six (6) to thirteen (13) interface pins while an ISA bus may include thirty-six (36) to ninety-eight (98) interface pins. It may be advantageous to use a bus with a "low pin count", such as LPC bus 175, since using a reduced or lower pin count may be easier to implement and/or may consume less "real estate" (e.g., space) on a computer system board which may result in one or more lower costs (e.g., production costs, power costs, etc.). In various embodiments, LPC bus 175 may allow for various chips or integrated circuit devices to be interfaced with and/or coupled to computer system 101, among others.

In various embodiments, a super I/O 176 may implement various functions and be coupled to LPC bus 175. For example, super I/O 176 may implement one or more of a keyboard interface 178, a mouse interface 179, a parallel port interface 181 (e.g., an IEEE 1284 interface), and/or a serial port interface 182 (e.g., a RS-232 interface), among others.

In some embodiments, computer system 101 may include a bus interface 150 which may couple LPC bus 175 to an IC device interface 130. For example, IC device interface 130 may include an ISO-7816 interface. In some embodiments, the ISO-7816 interface of IC device interface 130 may be incompatible with LPC bus 175, and bus interface 150 may allow the ISO-7816 interface of IC device interface 130 to couple to LPC bus 175. In other words, bus interface 150 may allow IC device interface 130 to couple to and/or interact with LPC bus 175. IC device interface 130 may couple to an IC device 180A by physical contact (see FIG. 1A), and/or IC device interface 130 may couple to an IC device 180B in a wireless fashion (see FIG. 1B).

A user of computer system 101 may carry IC device 180A and/or 180B. In some embodiments, IC device 180A and/or 180B may be included in several objects that may be carried by the user. In various examples, IC device 180 (including 180A and/or 180B) may be included in an identification (ID) card (e.g., a driver's license, etc.), a smart card, a card issued from a bank or financial institution (e.g., an ATM card, a credit card, etc.), a subscriber identification module (SIM), a key chain, a wireless telephone, or a PDA, among others. Information (i.e. user credential information) provided by IC device 180A and/or 180B may indicate ID information and/or authentication information (e.g., a username and/or password, etc.) of the user of computer system 101.

In some embodiments, program instructions (e.g., OS 200), included in memory 120, may be executable by CPU 110 to initiate read and/or write cycles of LPC bus 175, and bus interface 150 may be operable to allow IC interface 130 and IC devices 180A and/or 180B to interact with the read and/or write cycles of LPC bus 175. For example, information may be received from IC device 180A and/or 180B during a read cycle of LPC bus 175, and information may be transmitted to IC device 180A and/or 180B during a write cycle of LPC bus 175. In some embodiments, the read and/or write cycles of LPC bus 175 may include "special" read and/or write cycles of LPC bus 175. The "special" cycles of LPC bus 175 may be associated with various trusted channels (e.g., device identifications of trusted or secure devices coupled to LPC bus 175) and/or associated with protected I/O functionality. Some embodiments may include using various Intel® chipsets which may implement special read and/or write cycles. LPC bus 175 may include various reserved cycles, and these reserved cycles may be used to implement various read and/or write cycles of LPC bus 175.

In various embodiments, an IC device 180C may be coupled to computer system 101 in a substantially permanent fashion. For example, IC device 180C may be coupled to computer system 101 in substantially permanent fashion by soldering IC device 180C to computer system 101. Other means for substantially permanently coupling IC device 180C to computer system 101 may be used. In some embodiments, IC device 180C may store and/or provide information regarding computer system 101. For example, IC device 180C may provide ID information and/or authentication information, among other information, of computer system 101. The information regarding computer system 101 may include one or more changes of computer system 101. For example, a change may include a change in a memory 120 of computer system 101. The change in memory 120 may indicate that computer system 101 may be compromised (e.g., may include a virus a "Trojan horse", and/or spyware).

In some embodiments, an IC device that provides ID information and/or authentication information, among other information, of computer system 101 and is substantially permanently coupled to computer system 101 may be considered a trusted platform module (TPM). In other words, IC device 180C may be or include a TPM.

Figure 2:
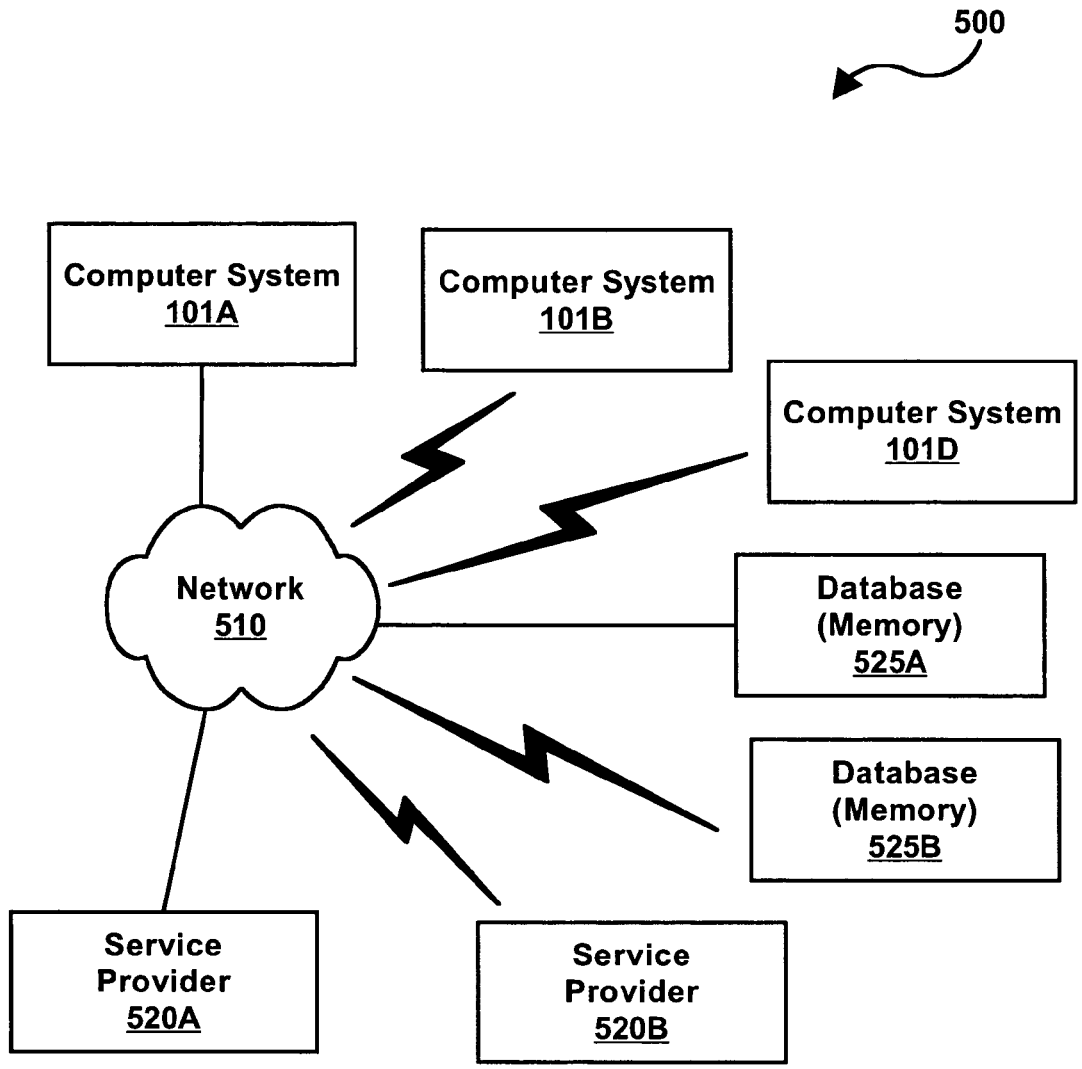
FIG. 2 is a block diagram of a network system, according to various embodiments.

FIG. 2—A Network System

FIG. 2 illustrates a block diagram of a network system 500, according to various embodiments. Network system 500 may include a network 510, computer systems 101A-101D, service providers 520A-520B, and/or databases (memories) 525A-525B.

In some embodiments, a computer system 101 (e.g., one of 101A-101D) may be coupled to a service provider 520 (e.g., one of 520A-520B) and/or a database 525 (e.g. one of 525A-525B) through network 510, and the computer system 101 may communicate, through network 510, with the service provider 520 to request and/or receive access to information. Service provider 520 may communicate, through network 510, with database 525. In some embodiments, service provider 520 may comprise one or more computer systems to implement various access control functionalities and/or store various information. For example, service provider 520 may include one or more database computer systems which may store and/or manage various information. In various embodiments, database 525 may include a relational database management system (RDBMS) such as Oracle, Microsoft SQL Server, PostgreSQL, etc., or database 525 may include memory which is available to various computer systems coupled to network 510.

Computer systems 101A and/or 101C may be coupled to network 510 in a wired fashion while computer systems 101B and/or 101D may be coupled to network 510 in a wireless fashion. Service provider 520A may be coupled to network 510 in a wired fashion while service provider 520B may be coupled to network 510 in a wireless fashion. Database 525A may be coupled to network 510 in a wired fashion while database 525B may be coupled to network 510 in a wireless fashion. Thus, a computer system 101, database 525, and/or a service provider 520 may be coupled to network 510 in a wired or wireless fashion. Computer system 101, database 525, and/or service provider 520 may each include various wireless or wired communication devices, such as a wireless Ethernet (e.g., IEEE 802.11) card, paging logic, RF (radio frequency) communication logic, a wired Ethernet card, a modem, a DSL device, a cable (television) modem, an ISDN device, an ATM (asynchronous transfer mode) device, a parallel or serial port bus interface, and/or other type of communication device.

Network 510 may include and/or be coupled to other types of communications networks, such as a public switched telephone network (PSTN), where computer system 101 and/or service provider 520 may send and receive information from/to the PSTN or other communication networks. Network 510 thus may include, be, and/or be coupled to, any of various wide area networks (WANs), local area networks (LANs), corporate networks, including the Internet. Network 510, computer system 101, and/or service provider 520 may use one or more secure methods, secure systems, and/or secure techniques for communicating information. For example, computer system 101 and service provider 520 may use network 510 to exchanged information, and network 510 may include a portion of the Internet and/or may include a portion of a wireless network such as a cellular telephone network, a satellite network, and/or a wireless Ethernet network, among others. Computer system 101 and service provider 520 may communicate in a secure fashion, e.g., using one or more methods and/or systems to encrypt/decrypt data they exchange.

Figure 3A:
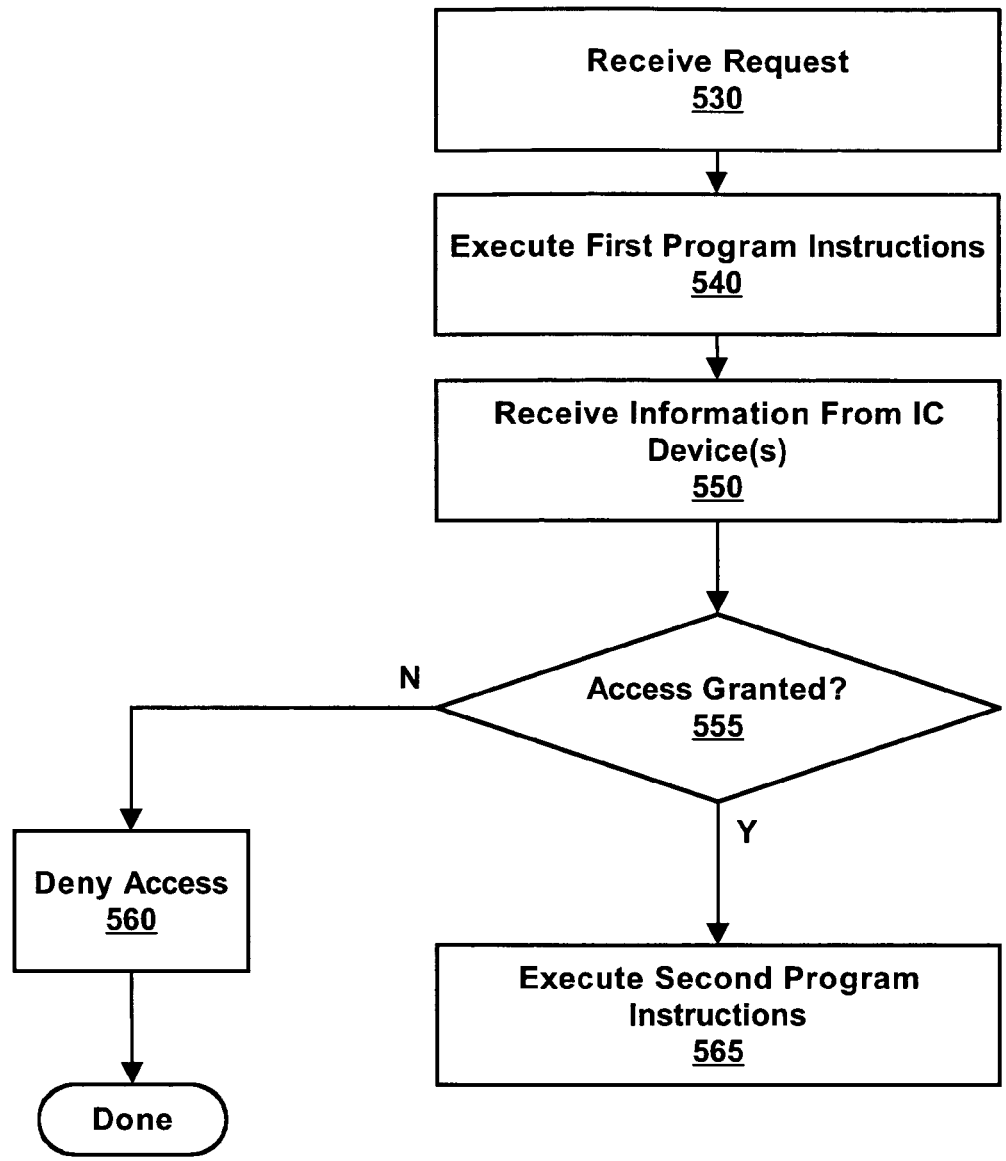
FIGS. 3A-3C illustrate methods for granting or denying access to an application, according to various embodiments.
Figure 3B:
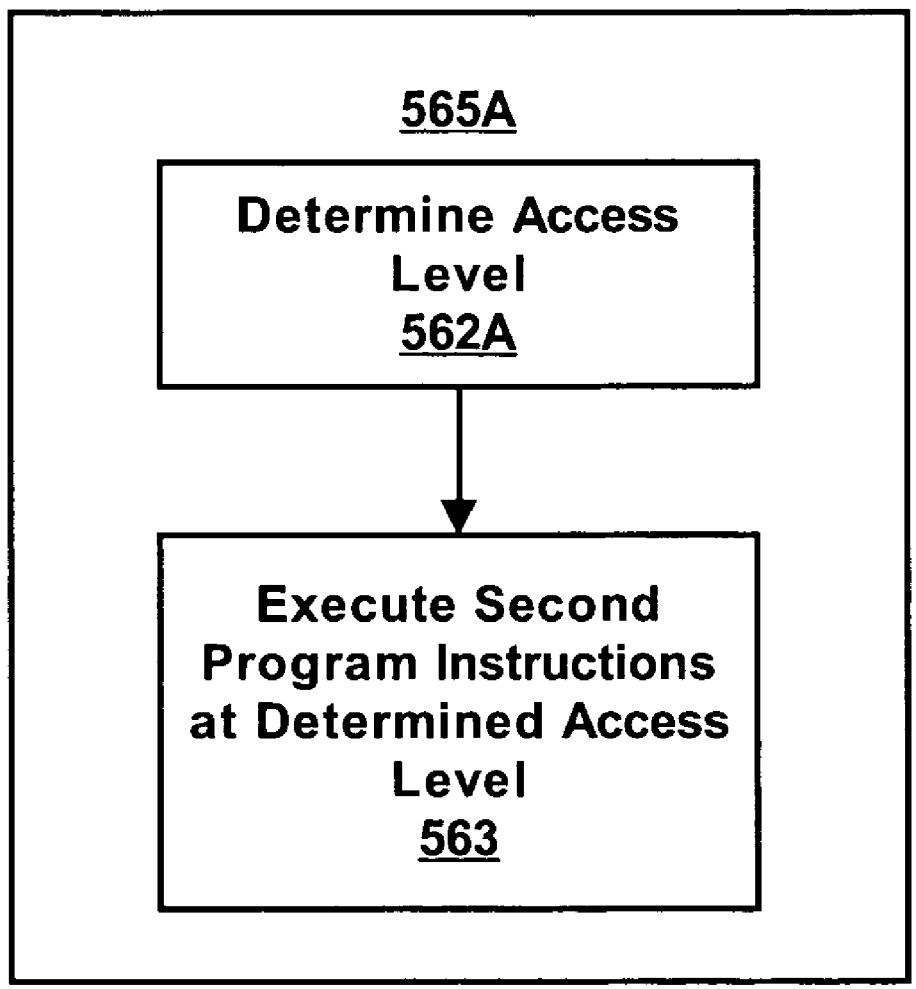
Figure 3C:
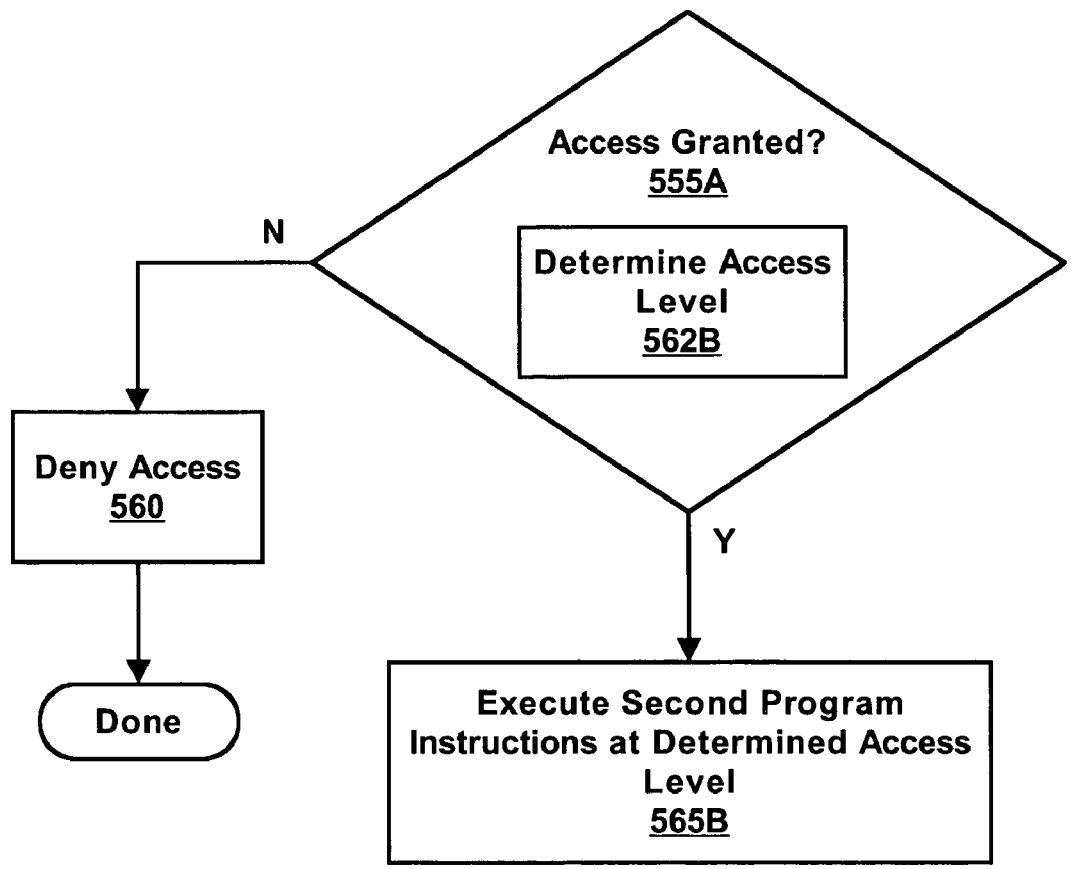

FIGS. 3A-3C—Determining Access to Program Instructions

FIGS. 3A-3C are flowchart diagrams illustrating methods for determining access to program instructions based on information received from one or more IC devices 180, according to various embodiments. It is noted that in various embodiments one or more of the method elements may be performed concurrently, in a different order, or may be omitted. Additional elements may be performed as desired.

In various embodiments, a user with IC device 180A may interface IC device 180A with computer system 101 (e.g., inserts IC device 180A into IC device interface 130), and/or a user with IC device 180B may position IC device 180B such that IC device interface 130 may interact with IC device 180B in a wireless fashion.

At 530, a request for access may be received by executing an application, such as an application 260. For example, a user may click on an icon or issue a command to execute application 260. In some embodiments, application 260 may include or be associated with at least one application ID (e.g., a software application name).

As indicated at 540, first program instructions may be executed. Software such as an OS 200 or application 260 may include the first program instructions which may be executed on computer system 101. The software may include program instructions executable by CPU 110 to operate LPC bus 175 such that information may be read and/or retrieved from one or more IC devices 180 (e.g., retrieved by interrogating one or more IC devices 180 to cause one or more IC devices 180 to respond with the information), thereby allowing the information to be received from one or more IC devices 180.

At 550, the information may be received from one or more IC devices 180 (e.g., 180A-180C). Information received from IC devices 180A and/or 180B may include user credential information. The information received from IC device 180 (e.g., one or more of 180A-180C) may comprise sensitive content (e.g., a username and/or password, etc.). Thus, one or more secure methods and/or systems may be used to communicate information to and/or from IC device 180, such that the one or more secure methods and/or systems may prevent and/or enfeeble communication eavesdropping, tampering, and/or forgery. In some embodiments, the information may be received from the one or more IC devices 180 (e.g., 180A-180C) may include access level and/or privilege information in addition to credential information. The information received from IC device 180 may be used to determine access to second program instructions (e.g., application 260 or a second part of application 260 if application 260 was executed at 540).

Granting access may be determined, at 555. In some embodiments, determining granting access may be based upon an indication that computer system 101 is compromised. If computer system 101 is compromised, access may not be granted. For example, as mentioned above with regard to IC device 180C, computer system 101 may comprise a virus, "Trojan horse", and/or "spyware", among other malicious software and/or unwanted software. The information received in 550 may include content which indicates that computer system 101 comprises the virus, "Trojan horse", and/or "spyware", and computer system 101 is, therefore, compromised. Thus, in this example, access may not be granted, and thus, access may be denied at 560.

Figure 5A:
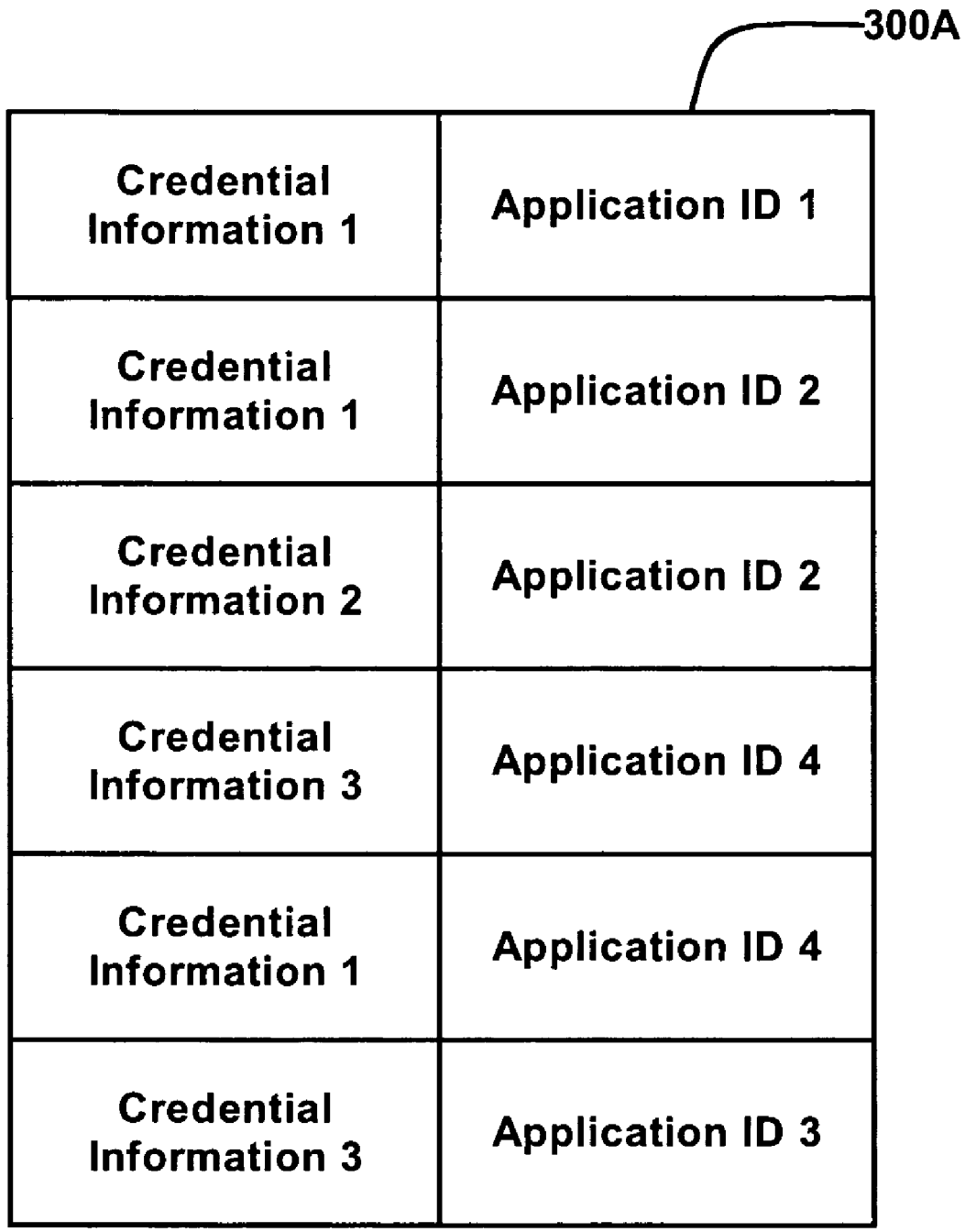

In some embodiments, determining granting access may be based on the user credential information. In determining access, computer system 101 may access a memory, and the memory may comprise a data structure, such as a data structure 300A illustrated in FIG. 5A. Data structure 300A may comprise a list of user credential information and a corresponding list of applications identifications (IDs). In other words, data structure 300A may comprise a table having a plurality of tuples, with each tuple having credential information (e.g., user credential information which may include a username, a password, etc.) and an ID (e.g., an application ID, program instructions ID, etc.). As shown in FIG. 5A, data structure 300A includes six different sets of two-tuples. It is noted that data structure 300A may take any of various forms. It is also noted that, in various embodiments, other data structures may be used in addition to data structure 300A or instead of data structure 300A.

In accessing the memory which comprises data structure 300A, computer system 101 may index into data structure 300A using at least a portion of the information received in 550. For example, computer system 101 may use user credential information, which may have been received in 550 and at least one application ID of application 260 to index into data structure 300A to determine if access may be granted. If the credential information and/or the at least one application ID (e.g., an application ID, program instructions ID, etc.) is not found in data structure 300A, access may not be granted. If access is not granted, access may be denied as indicated at 560. If the credential information and the at least one application ID are found in data structure 300A, access may be granted. If access is granted, then the second program instructions may be executed as indicated at 565.

In some embodiments, executing the second program instructions may be based on an access level and/or privilege level, as shown in FIG. 3B, at 565A. In other words, the access level and/or privilege level may grant access to some of the functions of the second program instruction, and/or deny access to various functions of the second program instructions.

In one example, the second program instructions may include stock trading software or a second portion of the stock trading software. The stock trading software (e.g., application 260) may include variegated functions which may include viewing one or more portfolios, viewing stock prices, administrating bank account information, and/or trading one or more stocks, among others. In one instance, the access level and/or privilege level may grant access to view one or more portfolios of the user and/or to trade one or more stocks of the one or more portfolios. In a second instance, the access level and/or privilege level may grant access to manage and/or administrate two or more investment accounts (e.g., investment accounts of clients of an investment firm). In this instance the user may be a portfolio manager of the investment firm.

Figure 5B:
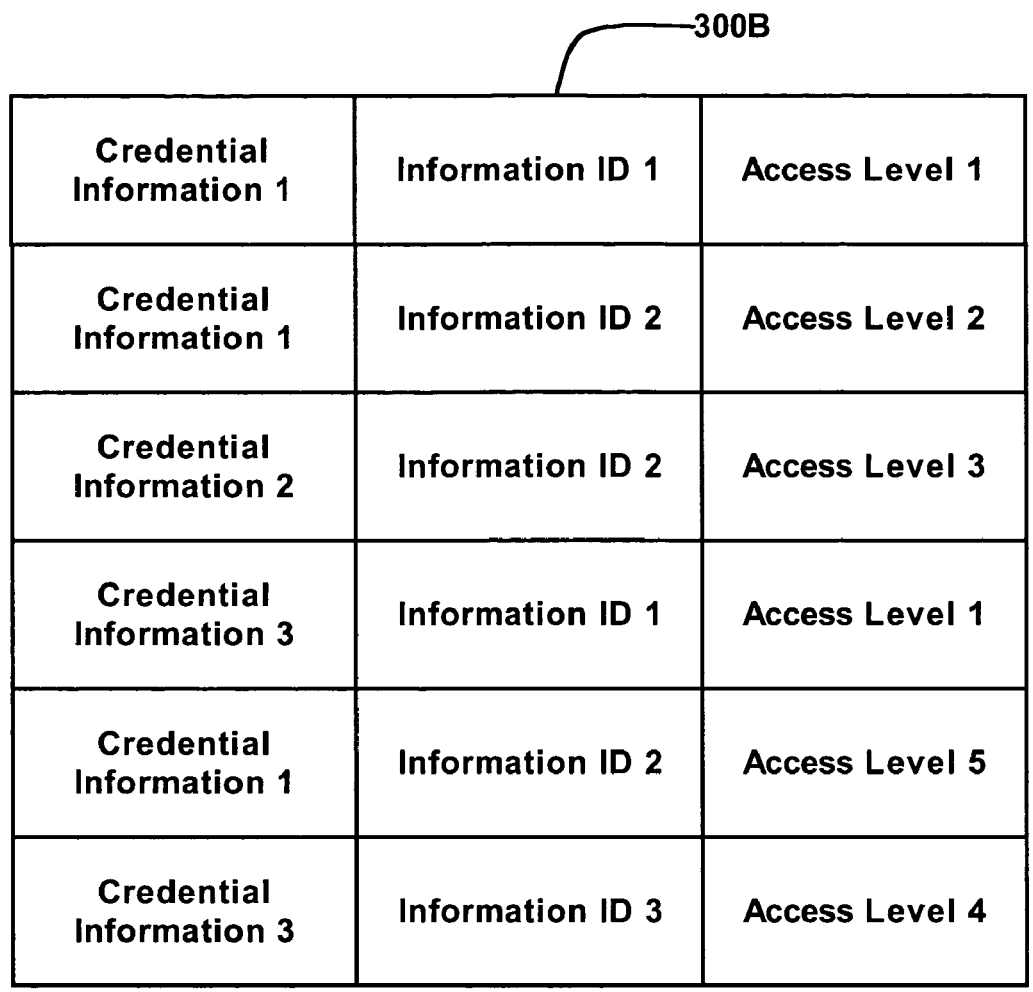

Various systems, methods, and/or data structures may be utilized in determining an access level and/or privilege level to base executing the second program instructions. As shown in FIG. 5B, a data structure 300B may comprise data structure 300A and/or the information of data structure 300A. Data structure 300B may further comprise a list of access level and/or privilege level information. In other words, data structure 300B may comprise a table having a plurality of tuples, with each tuple having the credential information (e.g., user credential information, etc.), an ID (e.g., an application ID, program instructions ID, etc.), and access level and/or privilege level information. As shown in FIG. 5B, data structure 300B includes six different sets of three-tuples. It is noted that data structure 300B may take any of various forms. It is also noted that the levels in FIG. 5B, such as "Access level 2", "Access level 5", etc., are used for illustrative purposes only to show different access levels.

As shown in FIG. 3B, an access level and/or privilege level for executing the second program instructions may be determined at 562A. In some embodiments, determining the access level may include computer system 101 accessing the memory comprising data structure 300B and indexing into data structure 300B using at least a portion of the information received in 550 (e.g., user credential information) and at least one application ID of application 260. After the access level and/or privilege level is determined, the second program instructions may be executed based on the determined access level and/or privilege level, at 563. As illustrated, in some embodiments, step 565A may comprise steps 562A and 563.

In various embodiments, data structure 300B may be used in addition to data structure 300A or instead of data structure 300A. For example, data structure 300B may be used instead of data structure 300A in step 555. In some embodiments, as shown in FIG. 3C, determining granting access to execute the second program instructions, at 555A, may also include determining the access level and/or privilege level, at 562B, for executing the second program instructions. For example, computer system 101 may index into data structure 300B once using the information received in 550 to determine if access is granted and to determine the access level and/or privilege level. After the access level and/or privilege level is determined, the second program instructions may be executed based on the determined access level and/or privilege level, at 565B.

In some embodiments, one or more of IC devices 180A-180B may provide at least a portion of the information comprised in data structure 300B. In one instance, one or more of IC devices 180A-180B may provide user credential information and access level and/or privilege level information. In a second instance, one or more of IC devices 180A-180B may provide one or more three-tuples of data structure 300B which are associated with the user of the one or more of IC devices 180A-180B.

Figure 4A:
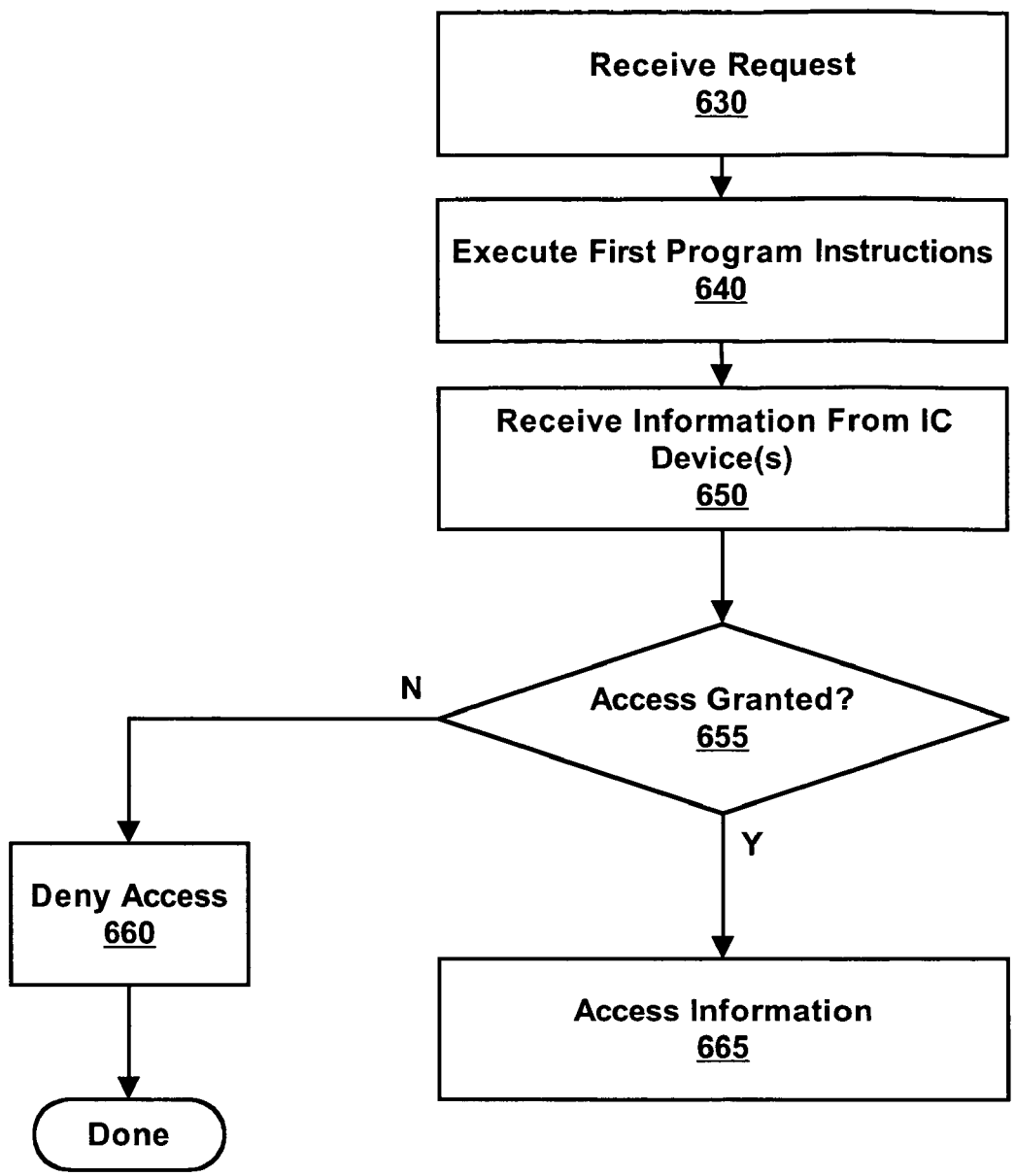
FIGS. 4A-4C illustrate methods for granting or denying access to information, according to various embodiments.
Figure 4B:
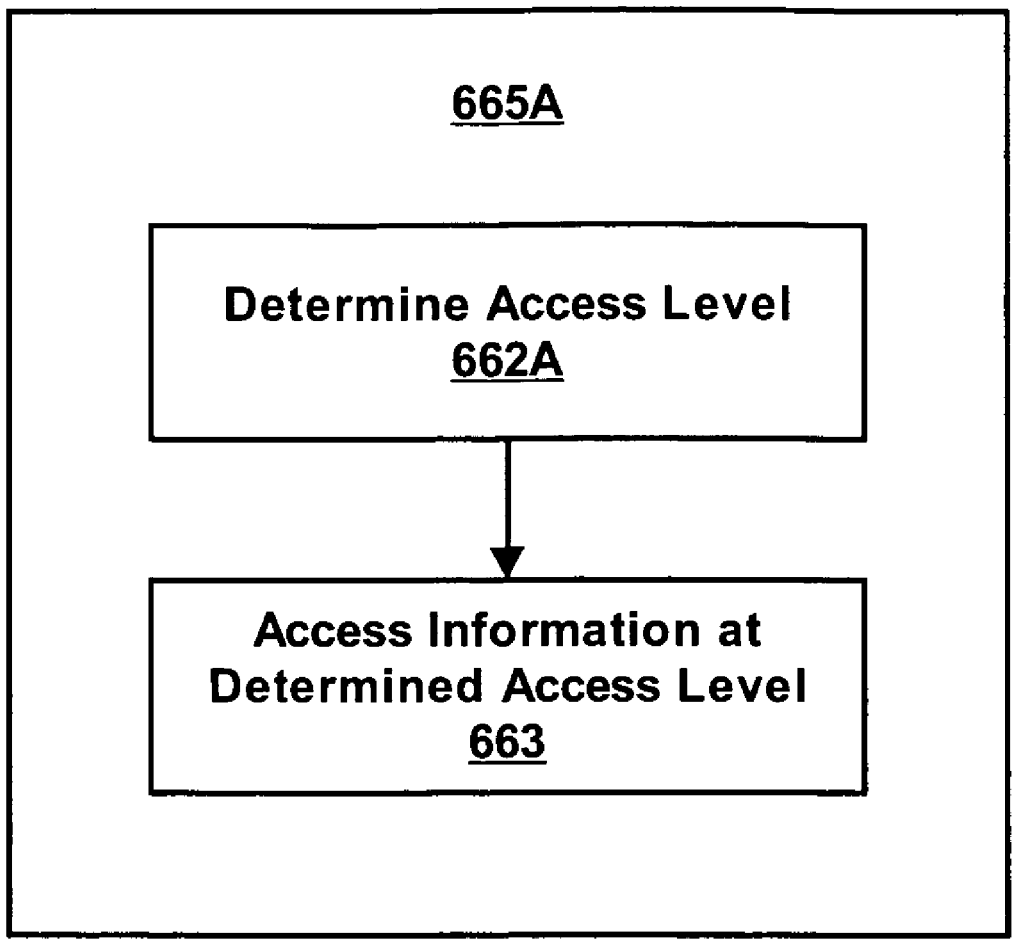
Figure 4C:
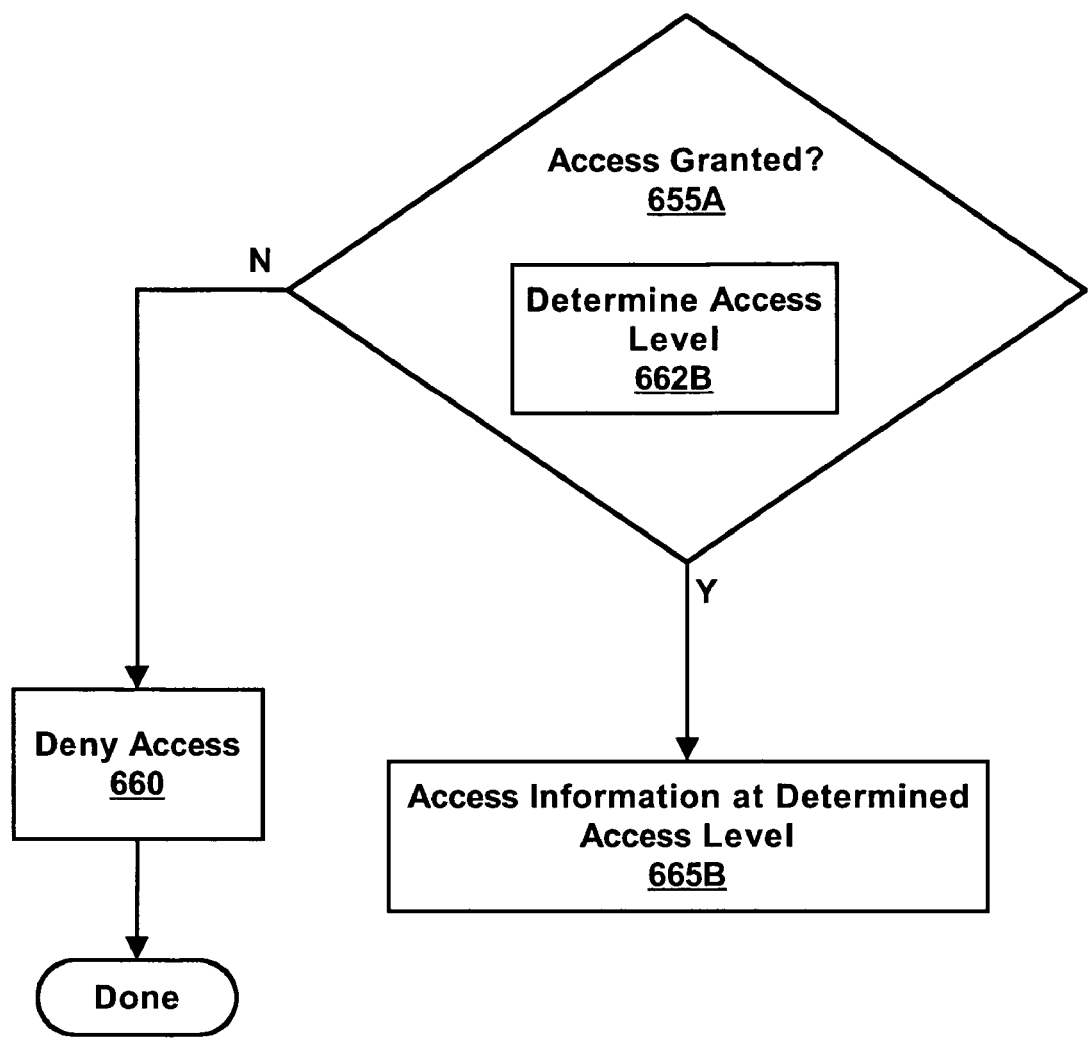

FIGS. 4A-4C—Determining Access to Information

FIGS. 4A-4C are flowchart diagrams illustrating methods for determining access to information based on information received from one or more IC devices 180, according to various embodiments. It is noted that in various embodiments one or more of the method elements may be performed concurrently, in a different order, or may be omitted. Additional elements may be performed as desired.

In various embodiments, a user with IC device 180A may interface IC device 180A with computer system 101 (e.g., inserts IC device 180A into IC device interface 130), and/or a user with IC device 180B may position IC device 180B such that IC device interface 130 may interact with IC device 180B in a wireless fashion.

At 630, a request for access of information may be received. The requested information may include private and/or sensitive information. For example, the sensitive and/or privileged information may include bank account information, trade secrets, and/or database information, among others. In some embodiments, the sensitive and/or privileged information may be stored in a memory of computer system 101. The sensitive and/or privileged information may be stored in a secure fashion (e.g., encrypted).

At 640, program instructions may be executed. Software such as OS 200 or application 260 may include the program instructions which may be executed on computer system 101 to operate LPC bus 175 such that information may be read and/or retrieved from one or more IC device 180 (e.g., retrieved by interrogating one or more IC devices 180 to cause one or more IC devices 180 to respond with the information), thereby allowing the information to be received from one or more IC devices 180.

At 650, the information may be received from one or more IC devices 180 (e.g., 180A-180C). Information received from IC devices 180A and/or 180B may include user credential information. The information received from IC device 180 (e.g., one or more of 180A-180C) may comprise sensitive content (e.g., user credential information which may include a username, a password, etc.). Thus, one or more secure methods and/or systems may be used to communicate information to and/or from IC device 180, such that the one or more secure methods and/or systems may prevent and/or enfeeble communication eavesdropping, tampering, and/or forgery. The information received from IC device 180 may be used to determine access to information (e.g., database information, banking information, etc.).

At 655, granting access may be determined. In some embodiments, determining granting access may be based upon an indication that computer system 101 is compromised, and if computer system 101 is compromised, access may not be granted. For example, as mentioned above with regard to IC device 180C, computer system 101 may comprise a virus, "Trojan horse", and/or "spyware", among other malicious software and/or unwanted software. The information received in 650 may include content which indicates that computer system 101 comprises the virus "Trojan horse", and/or "spyware", and computer system 101 is, therefore, compromised. Thus, in this example, access may not be granted and, thus, access may be denied at 660.

Figure 5C:
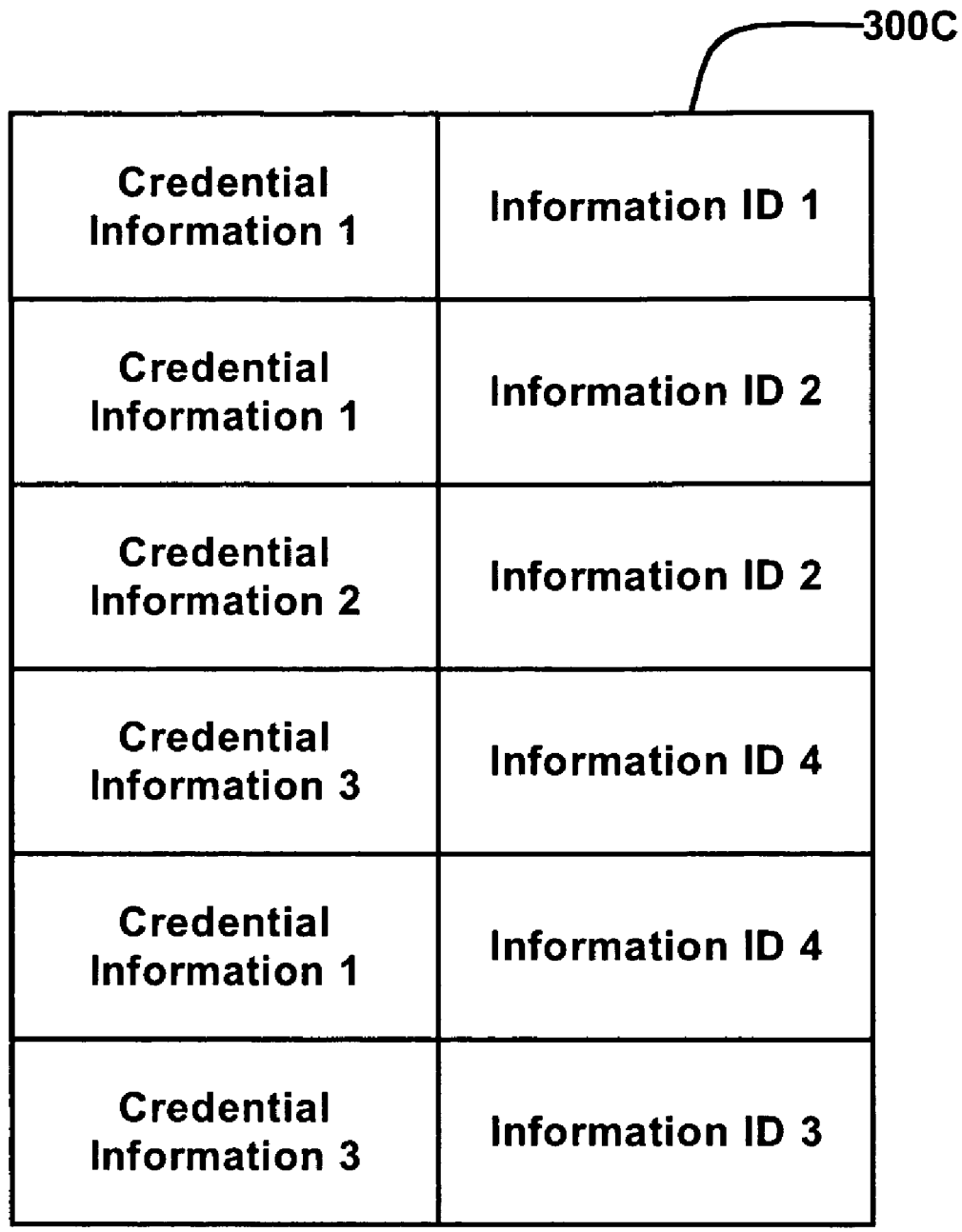

In some embodiments, determining granting access may be based on user credential information. In determining access, computer system 101 may access the memory which comprises data structure 300C (FIG. 5C). Data structure 300C may comprise a list of user credential information and a corresponding list of information IDs. In other words, data structure 300C may comprise a table having a plurality of tuples, with each tuple having credential information (e.g., user credential information which may include a username, a password, etc.) and an ID (e.g., an information ID, etc.). As shown in FIG. 5C, data structure 300C includes six different sets of two-tuples. It is noted that data structure 300C may take any of various forms. It is also noted that, in various embodiments, other data structures may be used in addition to data structure 300C or instead of data structure 300C.

In accessing the memory which comprises data structure 300C, computer system 101 may index into data structure 300C using at least a portion of the information received in 655. For example, computer system 101 may use user credential information, which may be received in 620, and at least one information ID which is associated with the requested information to index into data structure 300C to determine if access may be granted. If the credential information and/or the ID (e.g., the information ID of the requested data) is not found in data structure 300C, access may not be granted. If access is not granted, access may be denied as indicated at 660. If the credential information and the at least one information ID are found in data structure 300C, access may be granted. If access is granted, then the requested information may be accessed as indicated at 665.

In some embodiments, accessing the requested information may be based on an access level and/or privilege level, as shown in FIG. 4B, at 665A. In one example, a manager in a company may have an access level associated with him or her to access information of his or her employees. In one instance, the information may include salary information and/or vacation time, among others, corresponding to each employee of which reports to the manager. In a second, a member of the human resources (HR) department at the company may have an access level associated with him or her to access information about all employees of the company.

Figure 5D:
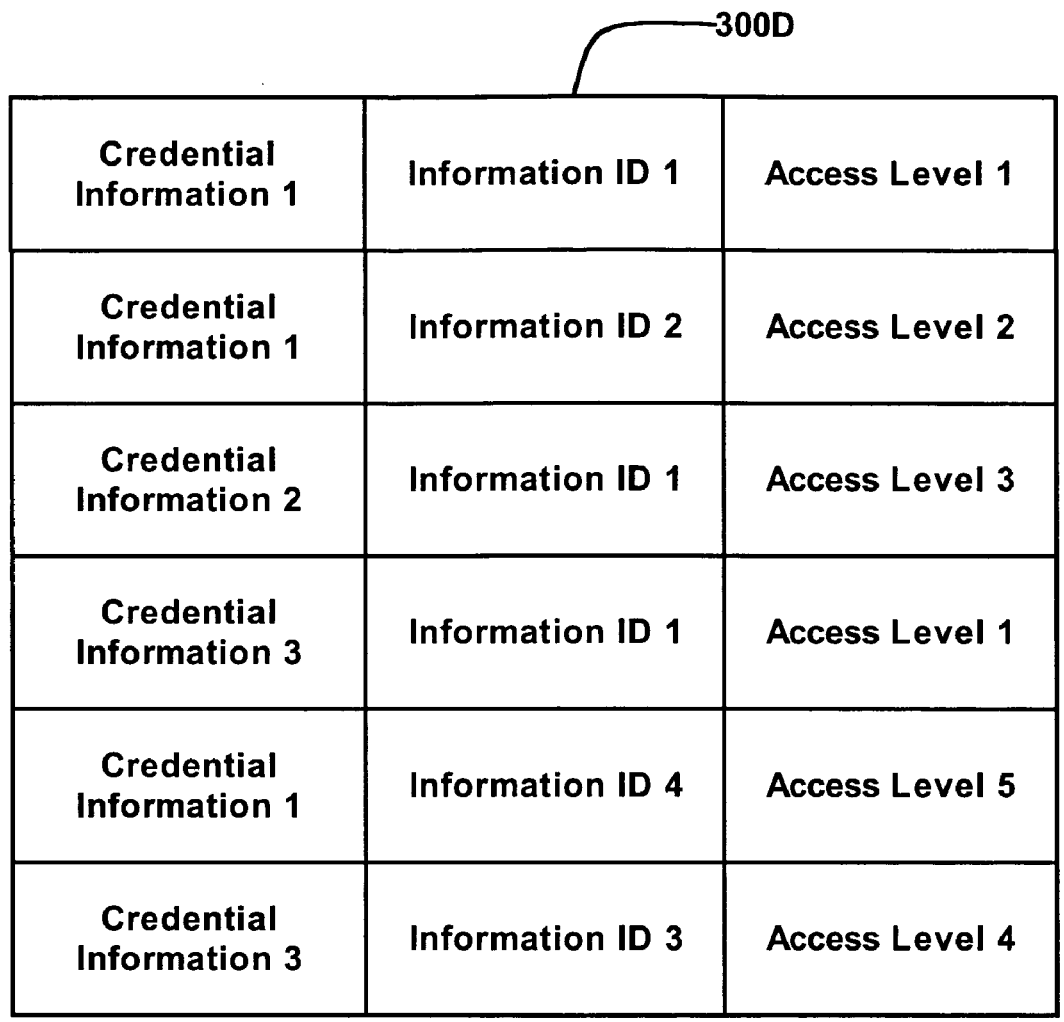

Various systems, methods, and/or data structures may be utilized in determining an access level and/or privilege level to base accessing the requested information. As shown in FIG. 5D, data structure 300D may comprise a list of access level and/or privilege level information which corresponds to information IDs. In other words, data structure 300D may comprise a table having a plurality of tuples, with each tuple having the credential information (e.g., user credential information, etc.), an ID (e.g., an information ID, etc.), and access level and/or privilege level information. As shown in FIG. 5D, data structure 300D includes six different sets of three-tuples, and it is noted that data structure 300B may take any of various forms. It is also noted that the levels in FIG. 5D, such as "Access level 2", "Access level 5", etc., are used for illustrative purposes only to show different access levels.

In FIG. 4B, an access level and/or privilege level for accessing the requested information may be determined at 662A. In some embodiments, determining the access level may include computer system 101 may include accessing the memory and indexing into data structure 300D using at least a portion of the information received in 650 (e.g., user credential information) and at least one information ID of the requested information. After the access level and/or privilege level is determined, the requested information may be accessed based on the determined access level and/or privilege level, at 663. As illustrated, in some embodiments, step 665A may comprise steps 662A and 663.

In various embodiments, data structure 300D may be used in addition to data structure 300C or instead of data structure 300C. For example, data structure 300D may be used instead of data structure 300C in step 655. In some embodiments, determining granting access to the requested information may also include determining an access level and/or privilege level for the requested information, as shown in FIG. 4C. For example, computer system 101 may index into data structure 300D once to determine if access is granted, at 655A, and to determine the access level and/or privilege level, at 662B. After the access level and/or privilege level is determined, the requested information may be accessed at the determined access level and/or privilege level, at 665B.

In some embodiments, the access level may be determined based on the information received in 650. For example, one or more of IC devices 180A-180B may provide at least a portion of the information comprised in data structure 300D. In one instance, one or more of IC devices 180A-180B may provide user credential information and access level and/or privilege level information. In a second instance, one or more of IC devices 180A-180B may provide one or more three-tuples of data structure 300D which are associated with the user of the one or more of IC devices 180A-180B.

As mentioned above, the requested information may be stored in a memory of computer system 101 in a secure fashion (e.g., encrypted). In some embodiments, one or more of IC devices 180A-180B may provide a cryptographic key that may be used to decrypt encrypted information, thereby granting access to the requested information that was stored and encrypted.

Data Structure Storing Application IDs and Information IDs

In some embodiments, a data structure 300E (FIG. 5E) may comprise a list of credential information, a corresponding list of IDs, and access level and/or privilege level information which corresponds to information the list of credential information and IDs. Furthermore, the ID information may be an application ID or an information ID. In other words, data structure 300E may comprise a table having a plurality of tuples, with each tuple having the credential information (e.g., user credential information, etc.), an ID e.g., an information ID, an application ID, etc.), and access level and/or privilege level information. As shown in FIG. 5E, data structure 300E includes six different sets of three-tuples, and it is noted that data structure 300B may take any of various forms.

It is also noted that the levels in FIG. 5E, such as "Access level 2", "Access level 5", etc., are used for illustrative purposes only to show different access levels.

In various embodiments, data structure 300E may be used in addition to one or more of data structures 300A-300D or instead of one or more of data structures 300A-300D.

FIGS. 6A-6D—Determining Access to Information Via a Service Provider

FIGS. 6A-6D are flowchart diagrams illustrating methods for determining access to information via a service provider based on information received from one or more IC devices 180 (e.g., 180A-180C), according to various embodiments. It is noted that in various embodiments one or more of the method elements may be performed concurrently, in a different order, or may be omitted. Additional elements may be performed as desired.

Figure 6A:
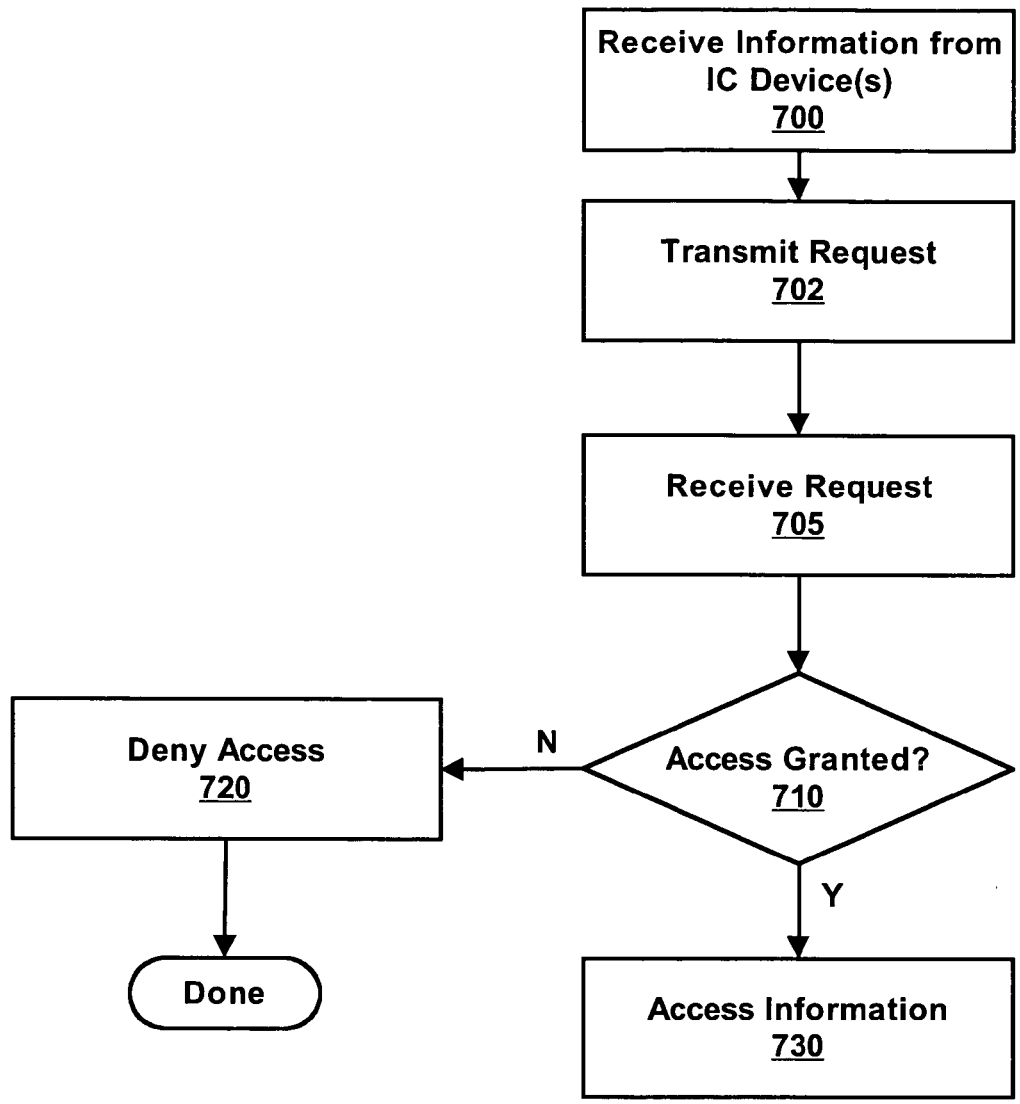
FIGS. 6A-6D illustrate methods for a service provider granting or denying access to information, according to various embodiments.

As shown in FIG. 6A, at 700, computer system 101 may receive information from one or more of IC devices 180A-180C which may be coupled to computer system 101. The information may include credential information (e.g., user credential information, computer system credential information, etc.). In some embodiments, computer system 101 may be coupled to network 510. At 702, computer system 101 may transmit a request for information or for access of information to network 510. The request may comprise various information including one or more of an information ID (e.g., indicating requested information), credential information (e.g., user credential information, computer system credential information, etc.), and/or cryptographic information, among others. Computer system 101 may acquire the credential information, and/or the cryptographic information, among other information, from the one or more IC devices 180A-180C.

At 705, service provider 520, coupled to network 510, may receive the request which was transmitted by computer system 101. Computer system 101 and service provider 510 may use one or more secure methods and/or systems to communicate information which may prevent and/or enfeeble communication eavesdropping, tampering, and/or forgery. For example, computer system 101 and service provider 520 may communicate using transport layer security (TLS) and/or a secure socket layer (SSL), among other secure systems and/or methods.

At 710, service provider 520 may determine if access to information indicated by the information ID may be granted. In some embodiments, determining granting access may be based upon an indication that computer system 101 is compromised, and if computer system 101 is compromised, access may not be granted. For example, as mentioned above, computer system 101 may be compromised by various malicious and/or unwanted software. The request received at 705 may include computer system credential information which may indicate that computer system 101 is compromised or may be used to determine if computer system 101 is compromised. For instance, service provider 520 may compare at least a subset of the computer system credential information of computer system 101 to established and/or certified information. If the at least a subset of the computer system credential information of computer system 101 do not match or do not correspond with the established and/or certified information, then access may be denied, at 720.

In some embodiments, determining granting access may be based on user credential information. In determining access, service provider 520 may access a memory which comprises a data structure 300C (FIG. 5C). In one example, data structure 300C may be comprised in a database 525 (e.g., 525A-525B) which may be coupled to service provider 520 via network 510. Service provider 510 and database 525 may use one or more secure methods and/or systems to communicate information which may prevent and/or enfeeble communication eavesdropping, tampering, and/or forgery. In a second example, service provider may comprise the memory which comprises data structure 300C.

In accessing the memory which comprises data structure 300C, service provider may search and/or index into data structure 300C using at least a portion of the request received in 705. For example, the request may include user credential information and an information ID. Service provider 520 may the use user credential information and the information ID to search and/or index into data structure 300C to determine if access may be granted. If the credential information and/or the information ID is not found in data structure 300C, access may not be granted. If access is not granted, access may be denied as indicated at 720. If the credential information and the information ID are found in data structure 300C, access may be granted. If access is granted, then the requested information may be accessed as indicated at 730.

Figure 6B:
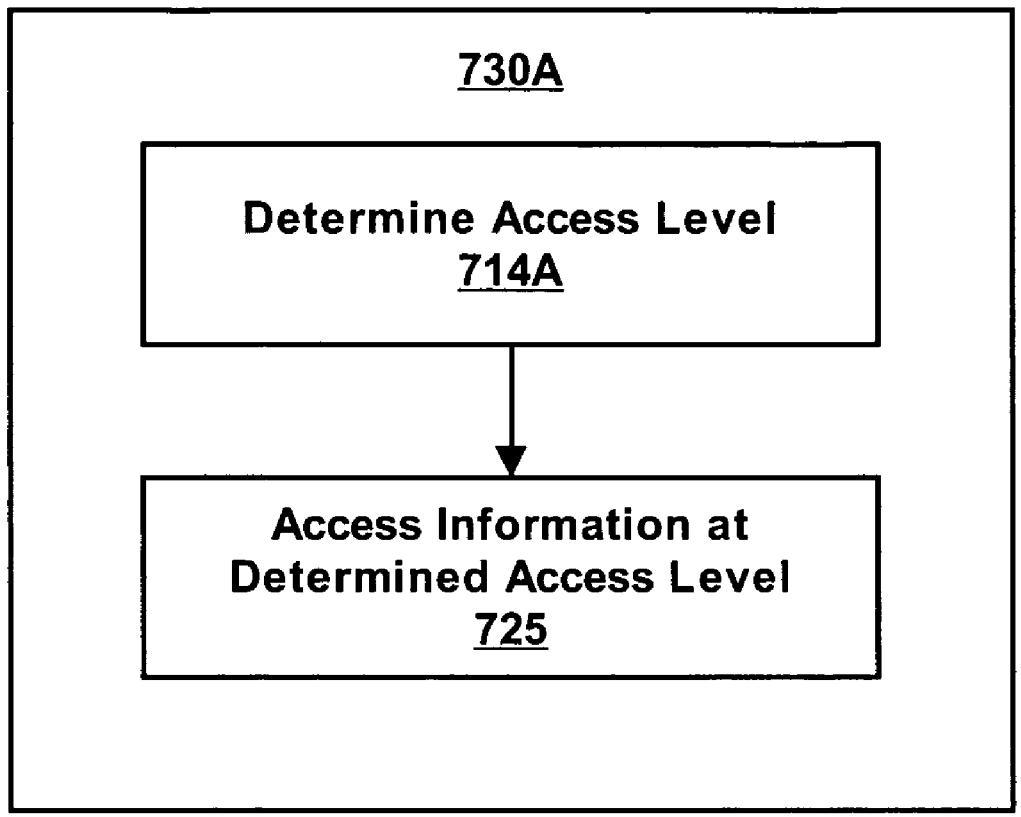

In some embodiments, accessing the requested information may be based on an access level and/or privilege level, as shown in FIG. 6B, at 730A. Various systems, methods, and/or data structures may be utilized in determining an access level and/or privilege level to base accessing the requested information. For example, a data structure 300D (FIG. 5D) which may comprise a list of access level and/or privilege level information which corresponds to information IDs may be used in determining an access level and/or privilege level. In one instance, data structure 300D may be comprised in database 525 (e.g., 525A-525B). In a second instance, service provider 520 may comprise the memory which comprises data structure 300D.

At 714A, an access level and/or privilege level for accessing the information indicated by the information ID may be determined. In some embodiments, determining the access level may include service provider 520 accessing the memory and searching and/or indexing into data structure 300D using the credential information and the information ID included in the request. After the access level and/or privilege level is determined, the information indicated by the information ID may be accessed based on the determined access level and/or privilege level, at 725.

Figure 6C:
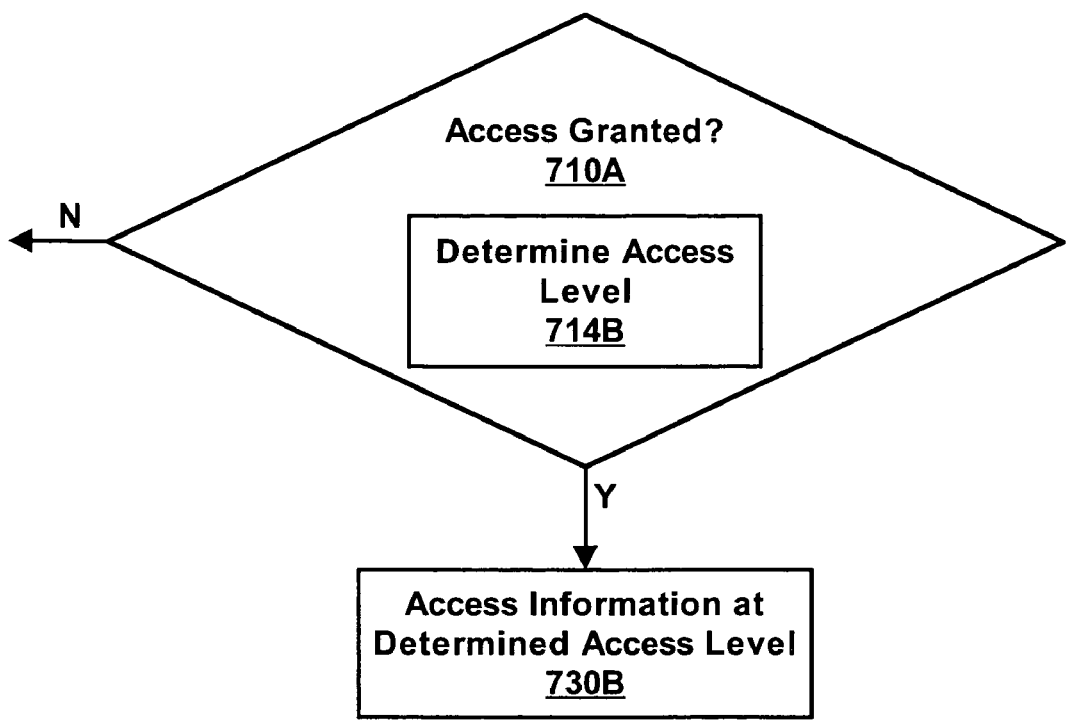

In various embodiments, data structure 300D may be used in addition to data structure 300C or instead of data structure 300C. For example, data structure 300D may be used instead of data structure 300C in step 720. In some embodiments, as shown in FIG. 6C, determining granting access to the requested information may also include determining an access level and/or privilege level for the information indicated by the information ID included in the request. For example, service provider 520 may search and/or index into data structure 300D once to determine if access is granted, at 720A, and to determine the access level and/or privilege level, at 714B. After the access level and/or privilege level is determined, the requested information may be accessed at the determined access level and/or privilege level, at 665B.

Figure 6D:
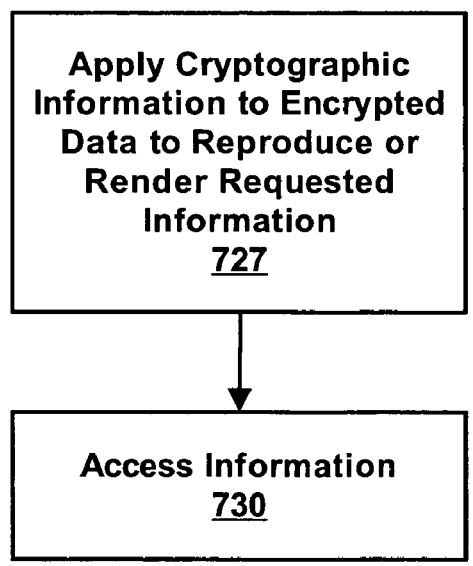

In some embodiments, the information indicated by the information ID may be stored in a secure fashion (e.g., encrypted), and cryptographic information included in the request may be used to access the information indicated by the information ID. As shown in FIG. 6D, the cryptographic information may be applied to encrypted data, at 727. For example, the cryptographic information may include a cryptographic key which may be used to decrypt the encrypted data to reproduce or render the information indicated by the information ID. After the information indicated by the information ID is reproduced or rendered from the encrypted data and the cryptographic key, the information indicated by the information ID may be accessed at 730.

Figure 7:
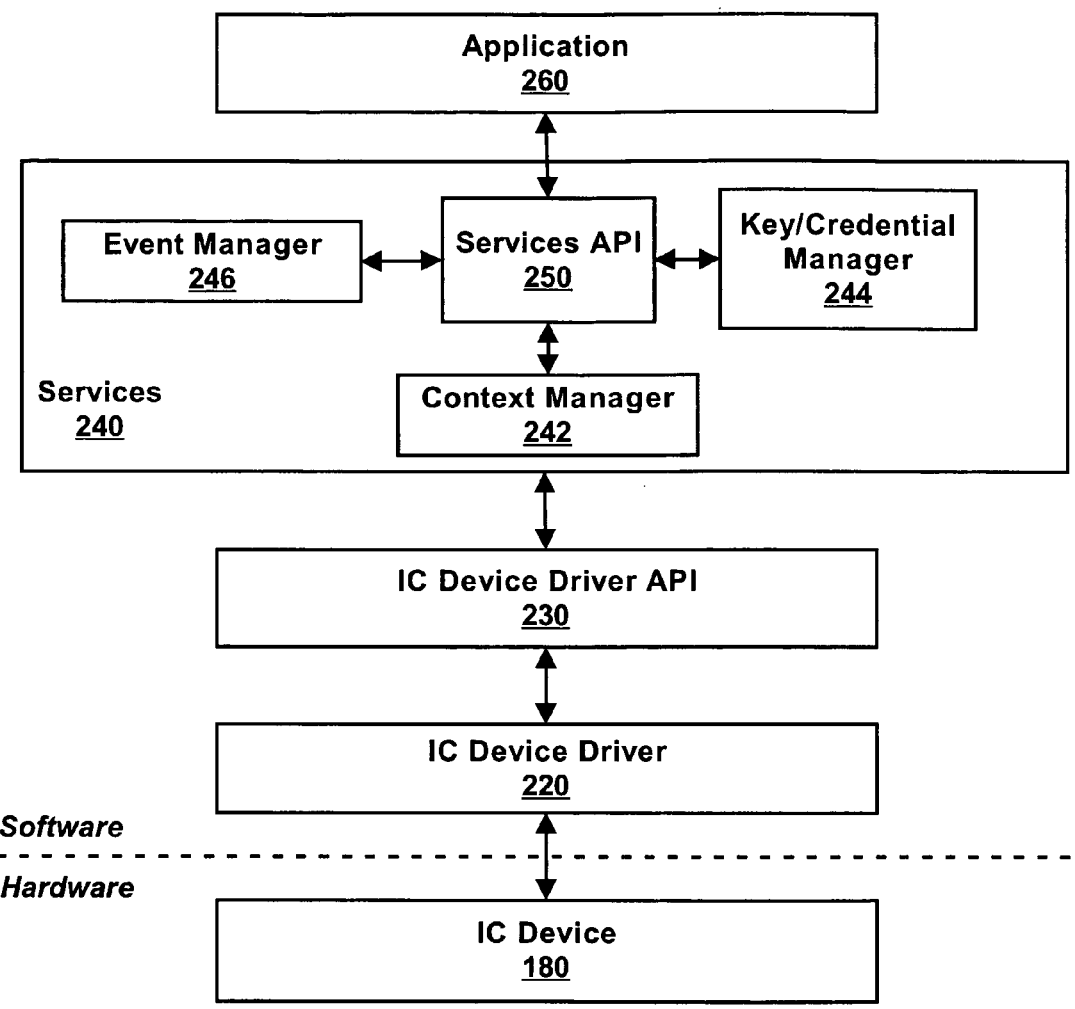
FIG. 7 is a block diagram of program instructions and an integrated circuit device, according to various embodiments.

FIG. 7—Program Instruction Interaction

FIG. 7 is a block diagram illustrating program instructions that may be executed on computer system 101 interacting with IC device 180 (e.g., 180A-180C), according to various embodiments. In various embodiments, the program instructions may include elements 220-250, and the program instructions may be included in OS 200, a secure computing software stack, and/or a trusted operating system, among others. Each of the elements 220-250 may include program instructions and/or software executable by computer system 101. It is noted that in various embodiments one or more of the elements may operate concurrently, be combined with another element, or may be omitted. Additional elements may be included as desired.

As shown in FIG. 7, the program instructions may include an IC device driver 220. In some embodiments, IC device driver may be a component or module of a kernel (e.g., software that directly interfaces with hardware) of OS 200. IC device driver 220 may send/receive data to/from IC device 180, and IC device driver 220 may send/receive data to/from an IC device driver API 230.

In various embodiments, IC device driver API 230 may provide an operating system independent interface to IC device 180. In other words, IC device driver API 230 may provide an application programming interface that a programmer may write source code (e.g., a program or subroutine) once, and the source code will be usable on a variety of platforms (e.g., other computer systems and/or other operating systems). In some embodiments, IC device driver API 230 may provide a user mode interface for accessing IC device 180. For example, the user mode interface may allow a software program executed by any user of computer system 101 to interface with IC device 180.

In some embodiments, IC device driver API 230 may interface with services 240, and services 240 may include one or more software programs and an application programming interface, such as a services API 250, which may allow and/or enable interaction of application 260 and services 240. In some embodiments, application 260 may interact and/or communicate with IC device 180 through services API 250 and services 240.

In some embodiments, services API 250 may allow concurrent use of IC device 180 even though IC device 180 and/or IC device driver 220 may be "single-threaded". In other words, services API 250 may allow multiple tasks to access IC device 180 even though IC device 180 and/or IC device driver 220 may only be operable to execute one task in some time period.

Services 240 may include a context manager 242, and the context manager 242 may provide various methods and/or systems for preserving (e.g., storing and retrieving) various states of IC device 180. In other words, the context manager 242 may cache various keys (e.g., encryption keys), platform configuration registers (PCRs), encrypted data, and/or hash data, among various other objects or information. For example, a first software application may use a first state of IC device 180 and a second software application may use a second state of IC device 180. When the second software application accesses IC device 180, the context manager 242 may store the first state of IC device 180. When the first software application uses IC device again, the context manager 242 may configure IC device 180 to the first state. In some embodiments, the context manager 242 may store states associated with the second application before configuring IC device 180 with the first state.

In various embodiments, the context manager 242 may provide one or more handles where each handle provided by the context manager may be associated with various states of IC device 180. In other words, the one or more handles may allow an/or enable an application or a thread (e.g., an operation and/or subroutine of an application) to identify a state of IC device 180 with which it may be associated. For example, the context manager 242 may provide the first software application a first handle to identify the first state of IC device 180, and the context manager 242 may provide a second handle to identify the second state of IC device 180. The context manager 242 may provide a first handle to different applications and/or to different threads within a single application that may share a same context (e.g., same state of IC device 180). The context manager 242 may provide a separate handle to different software applications and/or to different threads within a single software application, and each separate handle may be associated with a state which is separate from other states.

Services 240 may include a key/credential manager 244. For example, a key and/or credential may be associated with a computer system, a user, and/or an application, among others. One or more keys and/or credentials associated with a platform (e.g., an encryption key, endorsement credentials, platform credentials, conformance credentials, etc.) may be stored and/or managed by the key/credential manager 244.

In some embodiments, endorsement credentials and/or platform credentials may include information that may identify a specific platform and/or computer system. For instance, this information may be considered private and/or sensitive information. The key/credential manager 244 may store and/or manage other credentials and keys which may also include private and/or sensitive information. In some embodiments, the key/credential manager 244 may include one or more methods and/or systems to protect information that it may store from unauthorized access.

Services 240 may include an event manager 246, and the event manager 246 may manage events associated with one or more PCRs. For example, a platform configuration register (PCR) may store a value from the various metrics and/or measures which may provide information of computer system 101. For instance, the PCR may store a hash value (e.g., a fixed-length numeric value for a string of characters), and the hash value may be value from a hash function (e.g., SHA-1, MD5, etc.). The hash value may be generated from various identifications of computer system 101. For instance, the hash value may generated from one or more of BIOS (basic input/output system) information of computer system 101, and/or information of one or more devices (e.g., a video host controller, an IDE host controller, a USB host controller, a LAN host adapter, a WLAN host adapter, an audio adapter, etc.) of computer system 101, among others.

In some embodiments, one or more PCRs may include non-volatile memory. For example, this may allow various PCRs to retain information, such as hash values or other information, through one or more sleep cycles and/or power cycles of computer system 101.

The values stored in the PCRs may be used in various comparisons to validate and/or authenticate computer system 101. For example, a policy may be available to various "interrogators" or "challengers" to conduct various measurements which may provide one or more validation results of a platform and/or a computer system. In some embodiments, the policy may be used to generate a challenger hash value from one or more of BIOS (basic input/output system) information of computer system 101, and/or information of one or more devices (e.g., a video host controller, an IDE host controller, a USB host controller, a LAN host adapter, a WLAN host adapter, an audio adapter, etc.) of computer system 101, among others. After the challenger hash value is generated, a value from one or more PCRs may be compared against the challenger hash value to provide one or more validation results. The one or more validation results may be used by various software applications to determine if computer system 101 has been changed and/or compromised. In some embodiments, the event manager 246 may "re-take" various measurements (e.g., generate various challenger hashes based on one or more policies) after a sleep cycle and/or power cycle of computer system 101. This may allow and/or enable events manager 246 to validate no change to computer system 101 transpired during the sleep cycle or power cycle.

Figure 8A:
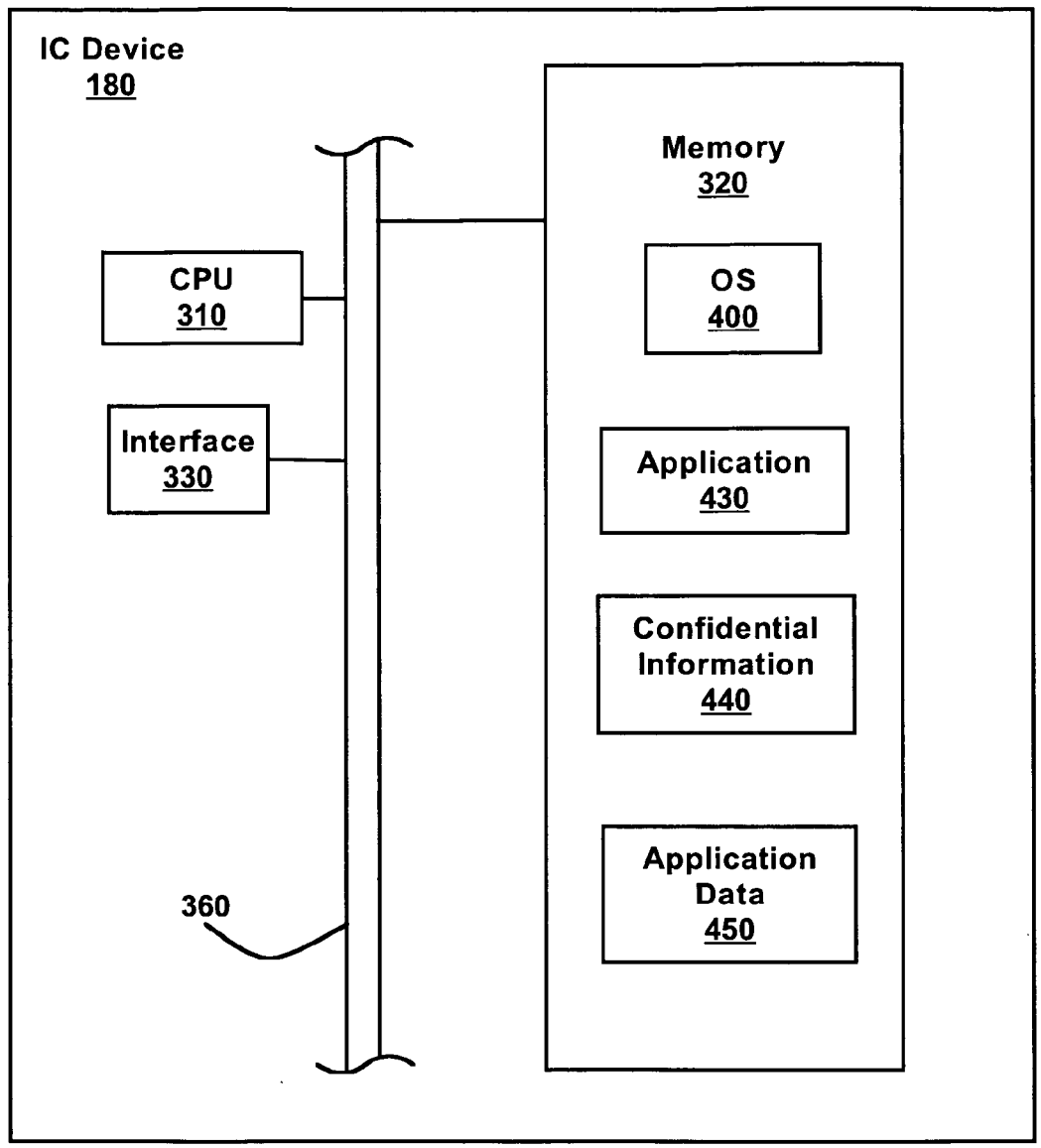
FIGS. 8A-8B are block diagrams of an integrated circuit device, according to various embodiments.
Figure 8B:
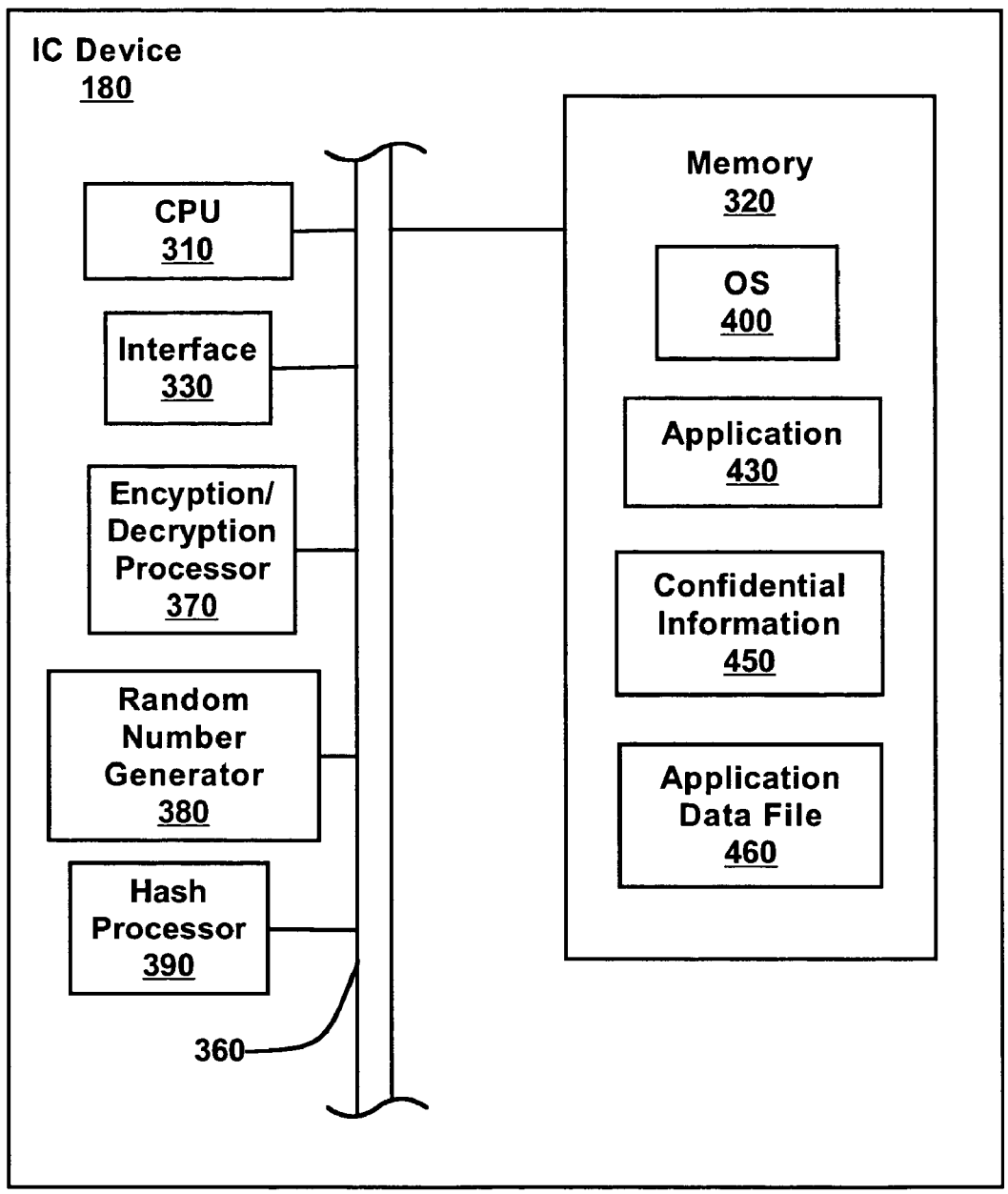

FIGS. 8A and 8B—An Integrated Circuit Device

In various embodiments, IC device 180 (e.g., 180A-180C) may include various components as shown in FIGS. 8A-8B. Elements of IC device 180 not necessary to understand the present description have been omitted for simplicity. IC device 180 may be or include a mechanism, such as a memory, which may allow the persistent storage and management of information for various embodiments disclosed herein.

As illustrated in FIGS. 8A-8B, IC device 180 may include a bus 360. Bus 180 may couple CPU 310 (e.g., a processor or microcontroller) to a memory 320. Memory 320 may include an OS 400. For example, OS 400 may include program instructions executable by CPU 310 which may allow and/or enable IC device 180 to exchange information with a computer system, such as computer system 101. Memory 320 may include an application 430 and/or application data 450. For example, application data 450 may include configuration and/or state information for and/or used by application 430.

In some embodiments, memory 320 may store confidential information 440. For instance, confidential information 440 may include various credential information, biometric information, credit card information, a personal identification number (PIN), a password, driver license information, a digital certificate which may include ID information, authentication information, social security information, a shared secret (e.g., a shared secret for creating a hash to authenticate information), an endorsement certificate (EC), an endorsement key (EK), a platform certificate, a conformance certificate, and/or bank account information, among other information. In some embodiments, confidential information 440 may include one or more application IDs, information IDs, and/or access level and/or privilege information. For example, an application ID may indicate that a user of computer system 101 may utilize a word processor, among other applications, on computer system 101. The application ID may indicate that the user of computer system 101 communicating with IC device 180 may not utilize a spread sheet program and/or an instant messaging program, among others.

IC device 180 may include an interface 330 which may be coupled to bus 360. IC device 180 may use interface 330 to communicate with computer system 101 and/or IC device interface 130. Interface 330 may include various contacts for making physical contact with one or more components or interfaces of computer system 101, such as IC device interface 130. For example, the contacts of interface 330 may include one or more input/output pins. The contacts of interface 330 may include one or more pins that may provide power to IC device 180 and/or may include one or more pins for conducting clock signals and/or communicating information between IC device 180 and computer system 101.

In some embodiments, interface 330 may allow IC device 180B to send and/or receive information to and/or from computer system 101 in a wireless fashion when interface 330 is proximate to computer system 101. For example, interface 330 may be within one meter, or a shorter distance, of computer system 101 for IC device 180B and computer system 101 to exchange information. In some embodiments, it may be beneficial to have IC device 180B in close proximity (e.g., within reach of a user) to computer system 101, since the user may be granted privileged access (e.g., access to sensitive information). In various embodiments, IC device 180B may concurrently communicate with two or more computer systems. For example, IC device 180B may be proximate to the two or more computer systems, such as a PDA (personal digital assistant) and a desktop computer system, among other types and/or combinations of computer systems.

In some embodiments, IC device may be interrogated with a request for information and ID and/or authentication information. IC device 180 may use various systems and/or methods to determine access of confidential information 440 to computer system 101. For example, OS 400 and/or application 430 may include program instructions executable by CPU 310 to allow and/or enable IC device 180 to use authentication information supplied to IC device 180 to determine if IC device 180 transmits information included in confidential information 440 to computer system 101. Authentication information supplied to IC device 180 may include biometric information from a human being (e.g., a user of computer system 101) based on physiological and/or behavioral characteristics. For example, the biometric information may include fingerprint information, a hand geometry, retina information, iris information, facial information, hand writing information (e.g., signature information), DNA information, and/or voice information, among others. For instance, computer system 101 may transmit fingerprint information to IC device 180, and IC device 180 use the fingerprint information in determining whether or not to transmit confidential information, such as user credentials, a password, etc., to computer system 101.

In various embodiments, OS 400 and/or application 430 may include program instructions which are executable by CPU 310 to allow and/or enable selective transferring information from confidential information 440 to computer system 101. For example, confidential information 440 may include credit card information from a credit card and a password, among other information. The password may be provided to computer system 101 while all other information (e.g., the credit card information) of confidential information 440 may not be transferred and/or provided to computer system 101.

As shown in FIG. 8B, IC device 180 may include a random number generator (RNG) 380 which may be coupled to bus 360. For example, RNG 380 may be included in a system for generating keys, such as cryptographic keys. IC device 180 may include an encryption/decryption processor 370, and encryption/decryption processor 370 may be coupled to bus 360. For instance, encryption/decryption processor 370 may be or include a RSA (Rivest, Shamir, and Adleman) processor. Encryption/decryption processor 370 may be included in a public-key cryptography system which implements a RSA algorithm. Moreover, encryption/decryption processor 370 may be included in various cryptographic systems. The various cryptographic systems may include one or more of: Diffie-Heliman, blowfish, elliptic curve, data encryption standard (DES), advanced encryption standard (AES), and/or digital signature algorithm (DSA), among others. In some embodiments, program instructions stored in memory 320 may be executable by CPU 310 to perform one or more functions and/or methods of encryption/decryption processor 370.

IC device 180 may include a hash processor 390, and hash processor 390 may be coupled to bus 360. For instance, a hash function and/or processor may transform an input of information and return a string, which may be called a hash value. In some embodiments, the returned string or hash value may be of a fixed-size. A hash function and/or hash processor may be considered to be "one-way" if it is "hard to invert", where "hard to invert" may mean that it may be computationally difficult or infeasible to determine input information from some hash value. In various embodiments, hash processor 390 may be included in one or more hash systems based on one or more hash functions such as MD2, MD5, SHA, and/or SHA-1, among others. In some embodiments, program instructions stored in memory 320 may be executable by CPU 310 to perform one or more functions of hash processor 390.

Memory Medium and Carrier Medium

One or more of the systems described herein, such as computer system 101, IC device 180, service provider 520, and network 510, may include a memory medium on which operating systems, software programs, file systems, and/or data may be stored. For example, service provider 520 may store a data structure including information regarding authentication information and/or access control information.

The term "memory medium" is intended to include various types of memory or storage, including an installation medium, e.g., a CD-ROM, or floppy disks, read-only memory (ROM), a random access memory (RAM) or computer system memory such as DRAM, SRAM, EDO RAM, Rambus RAM, NVRAM, EPROM, EEPROM, flash memory etc., or a non-volatile memory such as a magnetic media, e.g., a hard drive, or optical storage. The memory medium may include other types of memory as well, or combinations thereof. In addition, the memory medium may be located in a first computer system in which the programs are executed, or may be located in a second different computer system which connects to the first computer over a network. In the latter instance, the second computer system provides the program instructions to the first computer system for execution. The memory medium may also be a distributed memory medium, e.g., for security reasons, where a portion of the data is stored on one memory medium and the remaining portion of the data may be stored on a different memory medium. Also, the memory medium may be one of the networks to which the current network is coupled, e.g., a SAN (Storage Area Network).

Also, each of the computer systems described above may take various forms, including a personal computer system, mainframe computer system, workstation, network appliance, Internet appliance, mobile telephone, personal digital assistant (PDA), television system or other device. As noted above, the term "computer system" can be broadly defined to encompass any device having a processor which executes instructions from a memory medium.

Various embodiments further include receiving or storing instructions and/or data implemented in accordance with the present description upon a carrier medium. Suitable carrier media may include memory media as described above, as well as signals such as electrical, electromagnetic, or other forms of analog or digital signals, conveyed via a communication medium such as networks and/or a wireless link.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed:

1. A computer system comprising:
   a CPU;
   a low pin count (LPC) bus coupled to the CPU;
   an integrated circuit (IC) device interface coupled to the LPC bus; and
   a memory medium coupled to the CPU;
   wherein the memory medium stores program instructions which are executable by the CPU to:
   receive a request for access;
   receive first information from a first IC device coupled to the IC device interface, wherein the first IC device is operable to be carried by a user, and wherein the first information is received from the first IC device during one or more special read cycles of the LPC bus;
   determine a result for the request for access, wherein, in determining the result for the request, the result is based on at least a portion of the first information;
   if the result indicates the request for access is to be granted, grant said access; and
   if the result indicates the request for access is to be denied, deny said access:
   wherein the special read cycles are reserved type cycles of the LPC bus, wherein the reserved type cycles are associated with one or more trusted channels.

2. The computer system of claim 1, wherein the memory medium stores program instructions which are further executable by the CPU to:
   initiate the one or more special read cycles of the LPC bus.

3. The computer system of claim 1,
   wherein, in said granting said access, includes executing second program instructions.

4. The computer system of claim 3,
   wherein the second program instructions includes at least a portion of an application.

5. The computer system of claim 1, wherein the at least a portion of the first information includes authentication information.

6. The computer system of claim 1,
   wherein the first IC device is included in a smart card.

7. The computer system of claim 1,
   wherein the computer system is a portable computer system.

8. The computer system of claim 1, further comprising:
   a second IC device attached to the LPC bus;
   wherein the memory medium stores program instructions which are further executable by the CPU to:
   read second information from the second IC device, wherein the second information is read from the second IC device during one or more special read cycles of the LPC bus;

wherein, in determining the result for the request, the result is further based on at least a portion of the second information;
wherein, in said granting said access, includes executing second program instructions.

9. A memory medium comprising program instructions for access in a computer system which comprises a low pin count (LPC) bus, wherein the program instructions are computer-executable to:
read first information from a first integrated circuit (IC) device coupled to an IC device interface, wherein the IC device interface is coupled to at least one CPU of the computer system through the LPC bus, wherein the first information is read during one or more special read cycles of the LPC bus, and wherein the IC device is operable to be carried by a user;
determine if second program instructions are allowed to be executed, wherein, in determining if the second program instructions are allowed to be executed, includes using at least a portion of the first information; and
execute the second program instructions, if it was determined that the second program instructions are allowed to be executed;
wherein the special read cycles are reserved type cycles of the LPC bus, wherein the reserved type cycles are associated with one or more trusted channels.

10. The memory medium of claim 9, wherein the program instructions are further computer-executable to:
initiate the one or more special read cycles of the LPC bus.

11. The memory medium of claim 9,
wherein a first portion of an application includes the program instructions.

12. The memory medium of claim 11,
wherein at least a second portion of the application includes the second program instructions.

13. The memory medium of claim 9,
wherein the at least the portion of the first information includes authentication information.

14. The memory medium of claim 9,
wherein the computer system is a portable computer system.

15. The memory medium of claim 9,
wherein the first IC device is included in a smart card.

16. The memory medium of claim 9,
wherein the first IC device and the IC device interface communicate in a secure fashion.

17. The memory medium of claim 9,
wherein the program instructions are further computer-executable to:
read second information from a second IC device, wherein the second IC device is attached to the LPC bus, and wherein the second IC device is coupled to at least one CPU of the computer system through the LPC bus;
wherein, in determining if the second program instructions are allowed to be executed, includes using at least a portion of the second information.

18. The memory medium of claim 17,
wherein the program instructions are further computer-executable to:
initiate the one or more special read cycles of the LPC bus, wherein at least a subset of the second information read from the second IC device occurs during the one or more special read cycles of the LPC bus.

19. A method for access in a computer system which comprises a low pin count (LPC) bus, the method comprising:
receiving a request for access;
receiving first information from a first integrated circuit (IC) device, wherein the first IC device is operable to be carried by a user;
determining a result for the request for access, wherein said determining is based on at least a portion of the first information;
if the result indicates the request for access is to be granted, granting said access; and
if the result indicates the request for access is to be denied, denying said access;
wherein said receiving the information from the first IC device includes receiving the first information through the LPC bus during one or more special read cycles of the LPC bus;
wherein the special read cycles are reserved type cycles of the LPC bus, wherein the reserved type cycles are associated with one or more trusted channels.

20. The method of claim 19, further comprising:
initiating the one or more special read cycles of the LPC bus.

21. The method of claim 19,
wherein said granting said access includes executing program instructions.

22. The method of claim 21,
wherein the program instructions are included in an application.

23. The method of claim 19,
wherein said access includes access of information.

24. The method of claim 19,
wherein the at least the portion of the first information includes authentication information.

25. The method of claim 19,
wherein the first IC device is included in a smart card.

26. The method of claim 19,
wherein said receiving the first information includes receiving the first information in a secure fashion.

27. The method of claim 19,
wherein the computer system is a portable computer system.

28. The method of claim 19, further comprising:
receiving second information from a second IC device, wherein the second IC device communicates through the LPC bus, and wherein the second IC device is attached to the LPC bus;
wherein said determining includes using at least a portion of the second information.

29. The method of claim 28, further comprising:
detecting a change in the computer system;
wherein the at least a portion of the second information includes information of the change in the computer system;
wherein said determining is further based on the information of the change in the computer system.

30. A method of accessing information of a service provider through a network by a computer system, the method comprising:
receiving a request for access of information;
receiving first information from a first integrated circuit (IC) device coupled to a low pin count (LPC) bus which is comprised in the computer system;
receiving second information from a second IC device coupled to the LPC bus;
transmitting the request for access of the information, at least a portion of the first information from the first IC device, and at least a portion of the second information received from the second IC device to the service provider through the network;

the service provider determining a result for granting access to the information, wherein the result is based on the request for access, the at least a portion of the first information, and the at least a portion of the second information;

if the result indicates the request is to be granted, providing the information to the computer system; and if the result indicates that the request is not to be granted, denying access to the computer system;

wherein said receiving first information from the first IC device and said receiving second information from the second IC device occur during one or more special read cycles of the LPC bus; and wherein the special read cycles are reserved type cycles of the LPC bus, wherein the reserved type cycles are associated with one or more trusted channels.

31. The method of claim 30,
wherein the second IC device is attached to the computer system.

32. The method of claim 30,
wherein said receiving the first information includes receiving the first information in a secure fashion.

33. The method of claim 30,
wherein the at least a portion of the first information includes authentication information.

34. The method of claim 30,
wherein the first IC device is included in a smart card.

35. The method of claim 30,
wherein the computer system is a portable computer system.

36. The method of claim 35,
wherein the portable computer system communicates with the network in a wireless fashion.

37. The method of claim 30, further comprising:
detecting a change in the computer system;
wherein the at least a portion of the second information includes information of the change in the computer system;
wherein said determining includes using the information of the change in the computer system.

38. A system for providing access to one or more services, the system comprising:
a network;
a service provider coupled to the network;
a computer system coupled to the network;
wherein the computer system includes a CPU, a low pin count (LPC) bus coupled to the CPU, a first integrated circuit (IC) device coupled to the LPC bus, and a second IC device coupled to the LPC bus;
wherein the computer system is operable to receive first information from the first IC device, receive second information from the second IC device, send a request for access of information, and send third information to the service provider, wherein the third information is based on at least a portion of the first information and at least a portion of the second information;

wherein said first information and said second information from the second IC device are received during one or more special read cycles of the LPC bus; and wherein the service provider is operable to:
determine a result for the request for access of the information by the computer system, wherein, in determining the result, the result is based on at least a portion of the third information;
if the result indicates the request is to be granted, provide access of the information to the computer system; or
if the result indicates the request is to be denied, deny access of the information to the computer system; and wherein the special read cycles are reserved type cycles of the LPC bus, wherein the reserved type cycles are associated with one or more trusted channels.

39. The system of claim 38,
wherein the at least a portion of the first information includes authentication information.

40. The system of claim 38,
wherein the first IC device is included in a smart card.

41. The system of claim 38,
wherein the second IC device is attached to the LPC bus.

42. The system of claim 38,
wherein the computer system is a portable computer system.

43. The system of claim 42,
wherein the portable computer system is coupled to the network in a wireless fashion.

44. The system of claim 38,
wherein the computer system and the service provider communicate in a secure fashion.

45. The system of claim 38,
wherein the second IC device is operable to detect a change in the computer system;
wherein the at least the portion of the second information includes information of the detected change in the computer system;
wherein, in determining the result, the result is further based on the information of the detected change in the computer system.

\* \* \* \* \*

UNITED STATES PATENT AND TRADEMARK OFFICE
CERTIFICATE OF CORRECTION

PATENT NO. : 7,631,348 B2 Page 1 of 1
APPLICATION NO. : 10/995000
DATED : December 8, 2009
INVENTOR(S) : Villadiego et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 928 days.

Signed and Sealed this

Second Day of November, 2010

David J. Kappos
*Director of the United States Patent and Trademark Office*